(12) United States Patent
Tchedikian et al.

(10) Patent No.: US 11,663,904 B2
(45) Date of Patent: May 30, 2023

(54) REAL-TIME SCENE CREATION DURING USE OF A CONTROL DEVICE

(71) Applicant: 7Hugs Labs, Issy-les-Moulineaux (FR)

(72) Inventors: Simon Tchedikian, Issy-les-Moulineaux (FR); Mickael Touillaud, Issy-les-Moulineaux (FR)

(73) Assignee: 7HUGS LABS SAS, Issy-les-Moulineaux (FR)

( * ) Notice: Subject to any disclaimer, the term of this patent is extended or adjusted under 35 U.S.C. 154(b) by 0 days.

(21) Appl. No.: 17/274,422

(22) PCT Filed: Sep. 6, 2019

(86) PCT No.: PCT/IB2019/057592
§ 371 (c)(1),
(2) Date: Mar. 8, 2021

(87) PCT Pub. No.: WO2020/049546
PCT Pub. Date: Mar. 12, 2020

(65) Prior Publication Data
US 2022/0051554 A1 Feb. 17, 2022

Related U.S. Application Data

(60) Provisional application No. 62/728,736, filed on Sep. 7, 2018, provisional application No. 62/728,738, filed on Sep. 7, 2018.

(51) Int. Cl.
*G08C 17/02* (2006.01)
*G06F 3/0482* (2013.01)
(Continued)

(52) U.S. Cl.
CPC ........... *G08C 17/02* (2013.01); *G06F 3/0482* (2013.01); *G06F 3/0485* (2013.01);
(Continued)

(58) Field of Classification Search
CPC ................ G08C 17/02; G08C 2201/20; G08C 2201/30; G08C 2201/50; G08C 2201/92;
(Continued)

(56) References Cited

U.S. PATENT DOCUMENTS 8,280,009 B2  10/2012  Stepanian
8,937,534 B2 *  1/2015  Kreiner ................. G06F 3/0482
                                                                340/12.23
(Continued)

FOREIGN PATENT DOCUMENTS

EP         2879470 A1      6/2015
WO     2015175394 A2     11/2015
(Continued)

OTHER PUBLICATIONS

International Search Report and Written Opinion for International Patent Application No. PCT/IB2019/057591, dated Dec. 16, 2019, 12 pages.
(Continued)

*Primary Examiner* — Kieu D Vu
*Assistant Examiner* — Blaine T Basom
(74) *Attorney, Agent, or Firm* — Withrow & Terranova, P.L.L.C.

(57) ABSTRACT

Provided is a system and method for creating a configuration for a plurality of devices. The method includes monitoring user interaction with a control device to control each of the plurality of devices, recording, while monitoring the user interaction with the control device, at least one configuration setting based on at least one user input provided to the control device, in response to further user input, storing the at least one configuration setting in at least one memory of the control device, associating a plurality of configuration settings with a scene object, the plurality of configuration settings comprising the at least one configuration setting,
(Continued)

and in response to activation of the scene object via the control device, transmitting a plurality of control signals, the plurality of control signals based on the plurality of configuration settings and configured to control the plurality of devices.

35 Claims, 16 Drawing Sheets

(51) Int. Cl.
*G06F 3/04847* (2022.01)
*G06F 3/0485* (2022.01)
*H04N 21/422* (2011.01)

(52) U.S. Cl.
CPC ..... *G06F 3/04847* (2013.01); *H04N 21/4222* (2013.01); *H04N 21/42208* (2013.01); *H04N 21/42222* (2013.01); *H04N 21/42225* (2013.01); *G08C 2201/20* (2013.01); *G08C 2201/30* (2013.01); *G08C 2201/50* (2013.01); *G08C 2201/92* (2013.01)

(58) Field of Classification Search
CPC ............ G08C 2201/33; G08C 2201/93; G08C 17/00; G06F 3/0482; G06F 3/04847; G06F 3/0485; G06F 9/3017; G06F 9/30174; G06F 9/30178; G06F 11/34; G06F 11/3414; G06F 11/3438; G05B 2219/35257; G05B 2219/35258; G05B 2219/13017; G05B 2219/36449; H04N 21/42208; H04N 21/4222; H04N 21/42222; H04N 21/42225
See application file for complete search history.

(56) References Cited

U.S. PATENT DOCUMENTS

| | | | |
|---|---|---|---|
| 10,135,905 B2 | 11/2018 | Chaudhri et al. | |
| 10,353,576 B2* | 7/2019 | Coffman | G08C 17/02 |
| 11,003,147 B2* | 5/2021 | Smith | H04L 12/2809 |
| 2002/0101357 A1* | 8/2002 | Gharapetian | H04B 1/202 340/12.22 |
| 2008/0198035 A1* | 8/2008 | Ebbe | H04L 12/282 340/4.3 |
| 2010/0052843 A1* | 3/2010 | Cannistraro | H04N 21/6582 340/3.32 |
| 2010/0151825 A1 | 6/2010 | Millet Sancho | |
| 2012/0109384 A1 | 5/2012 | Stepanian | |
| 2014/0342709 A1 | 11/2014 | Stepanian | |
| 2015/0130596 A1 | 5/2015 | Aginsky et al. | |
| 2015/0145435 A1 | 5/2015 | Ogawa | |
| 2017/0180149 A1 | 6/2017 | McConnell et al. | |
| 2017/0357434 A1 | 12/2017 | Coffman et al. | |

FOREIGN PATENT DOCUMENTS

| | | | | |
|---|---|---|---|---|
| WO | WO-2016040280 A1 * | 3/2016 | | G05B 15/02 |
| WO | 2020049545 A1 | 3/2020 | | |

OTHER PUBLICATIONS

International Preliminary Report on Patentability for International Patent Application No. PCT/IB2019/057591, dated Mar. 18, 2021, 7 pages.

International Search Report and Written Opinion for International Patent Application No. PCT/IB2019/057592, dated Dec. 16, 2019, 12 pages.

International Preliminary Report on Patentability for International Patent Application No. PCT/IB2019/057592, dated Mar. 18, 2021, 7 pages.

Final Office Action for U.S. Appl. No. 17/274,417, dated May 5, 2022, 16 pages.

Non-Final Office Action for U.S. Appl. No. 17/274,417, dated Jan. 4, 2022, 14 pages.

Advisory Action, Examiner-Initiated Interview Summary, and AFCP 2.0 Decision for U.S. Appl. No. 17/274,417, dated Jul. 27, 2022, 6 pages.

Non-Final Office Action for U.S. Appl. No. 17/274,417, dated Feb. 9, 2023, 16 pages.

* cited by examiner

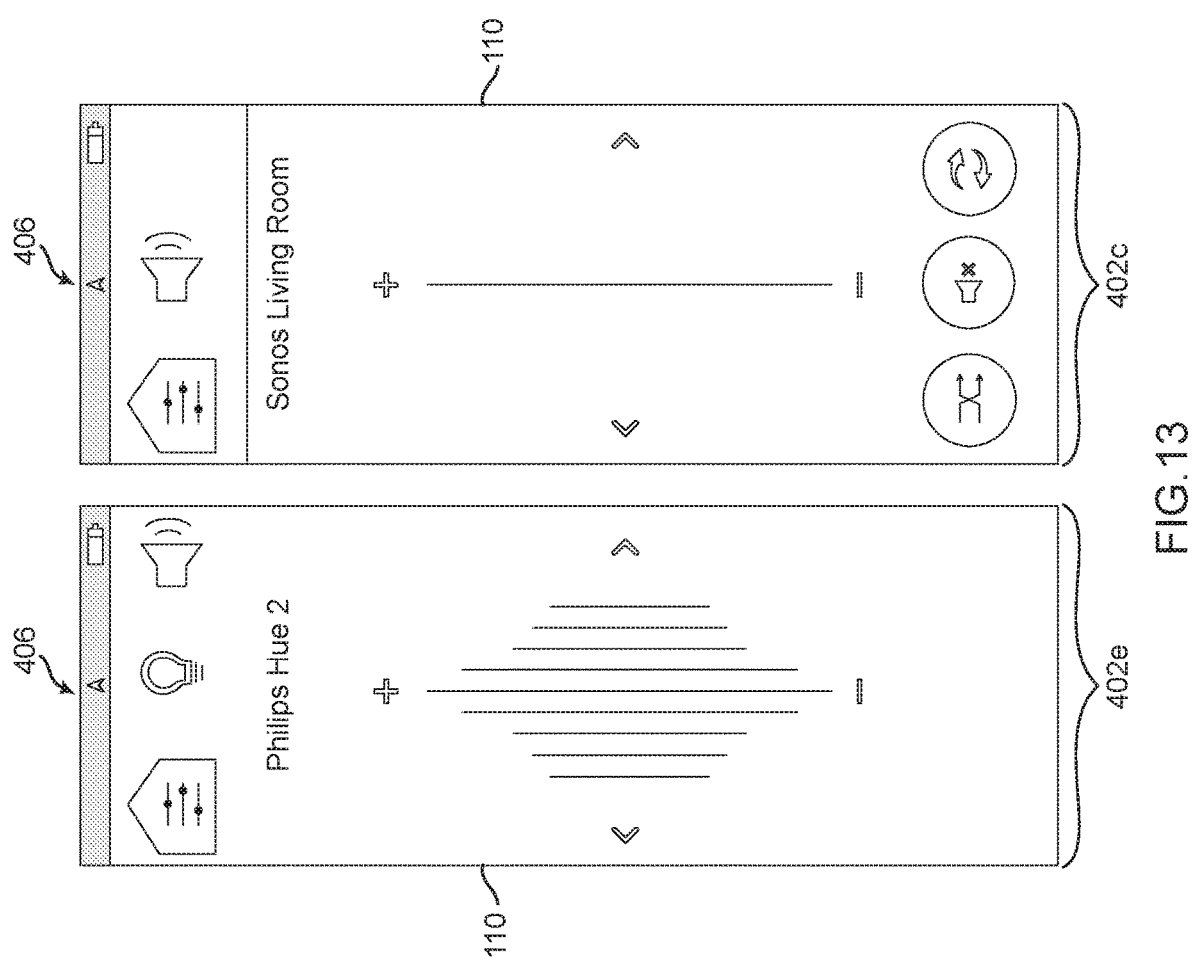

REAL-TIME SCENE CREATION DURING USE OF A CONTROL DEVICE

CROSS-REFERENCE TO RELATED APPLICATIONS

This application is a 35 USC 371 national phase filing of International Application No. PCT/IB2019/057592, filed Sep. 6, 2019, which claims priority to U.S. provisional patent applications Nos. 62/728,736 filed Sep. 7, 2018 and 62/728,738 filed Sep. 7, 2018, the disclosures of which are incorporated herein by reference in their entireties.

FIELD

This disclosure relates to a system and method for creating a configuration for a control device and, in some non-limiting examples, to a system and method for smart remote scene creation that provides a technological architecture for controlling multiple different devices of different types and for creating a home scene configuration that can be activated with a control device.

BACKGROUND

The use of smart devices throughout residential homes has become ubiquitous. Smart devices typically include devices coupled to a WiFi® network and controllable by a user's device connected to the same WiFi® network. Some example smart devices leveraged by home owners include TVs, thermostats, lights, and audio equipment (e.g., AMAZON ALEXAM. Having smart devices connected throughout the home or office requires separate control interfaces to communicate with each connected smart device. A method currently employed is to leverage distinct mobile applications on a mobile device where each particular mobile application may be used to control a specific one of the connected smart devices. Consequently, the user is required to physically open different applications on the user's mobile device to control each smart device. Opening and then toggling between different mobile applications on the user's mobile device is inefficient, cumbersome, time consuming, and prone to errors. Another existing method is to leverage a universal remote with fixed input buttons to control various devices. This is cumbersome and prone to errors because for each device there exists a number of irrelevant input buttons on the universal remote.

As such, it is desirable to establish a system and method that creates a seamless user experience to control multiple smart devices in an efficient and reliable manner.

SUMMARY

According to non-limiting embodiments or aspects, provided is a computer-implemented method for creating a configuration for a plurality of devices, comprising: in response to user input, monitoring user interaction with a control device to control each of the plurality of devices, the plurality of devices comprising at least one first device and at least one second device; recording, while monitoring the user interaction with the control device, at least one configuration setting based on at least one user input provided to the control device; in response to further user input, storing, with the control device, the at least one configuration setting in at least one memory of the control device; associating a plurality of configuration settings with a scene object, the plurality of configuration settings based on a plurality of user inputs and comprising the at least one configuration setting; and in response to activation of the scene object via the control device, transmitting a plurality of control signals, the plurality of control signals based on the plurality of configuration settings and configured to control the plurality of devices.

In non-limiting embodiments or aspects, the method further comprises: creating, on a mobile device separate from the control device, an identifier for the plurality of configuration settings; and in response to creating the identifier, automatically activating a user interface on the control device. In non-limiting embodiments or aspects, the method further comprises determining a plurality of devices in communication with the control device. In non-limiting embodiments or aspects, the method further comprises displaying a plurality of user interfaces configured to control the plurality of devices. In non-limiting embodiments or aspects, the user input comprises activation of a recording option on a user interface of the control device. In non-limiting embodiments or aspects, the further user input comprises activation of the recording option or a second recording option on the user interface of the control device. In non-limiting embodiments or aspects, the plurality of configuration settings are recorded as a sequence based on an order of the plurality of user inputs, and the plurality of control signals are transmitted based on the sequence. In non-limiting embodiments or aspects, the at least one first device comprises a stateful device configured for bidirectional communication with the control device.

In non-limiting embodiments or aspects, the method further comprises: after associating the plurality of configuration settings with the scene object, adjusting at least one configuration setting based on further user input on the control device. In non-limiting embodiments or aspects, the method further comprises: displaying, on the control device while recording the plurality of user inputs, a communication error notification based on detecting a network disruption; and stopping recording the plurality of user inputs based on detecting the network disruption. In non-limiting embodiments or aspects, the plurality of user inputs are input via a first user interface and a second user interface, the first user interface is configured to control the at least one first device, and the second user interface is configured to control the at least one second device. In non-limiting embodiments or aspects, the method further comprises: determining that the at least one first device and the at least one second device have been used together based on a usage pattern; and in response to determining that the at least one first device and the at least one second device have been used together based on the usage pattern, automatically displaying, on the control device, a second user interface configured to control both the at least one first device and the at least one second device.

In non-limiting embodiments or aspects, the control device comprises a remote control device comprising a touch screen, the remote control device configured to transmit control signals via at least one of infrared and radio frequencies. In non-limiting embodiments or aspects, the at least one first device comprises a lighting device, and the at least one configuration setting for the lighting device comprises a setting of at least one of an intensity and color. In non-limiting embodiments or aspects, the scene object is displayed in a scrollable list among a plurality of scene objects, wherein each scene object is displayed with a name and a graphical icon. In non-limiting embodiments or aspects, the plurality of configuration settings are recorded based on a state or setting of a device of the plurality of devices detected independently from the plurality of user inputs. In non-limiting embodiments or aspects, the method further comprises displaying a visual indicator when recording the plurality of configuration settings. In non-limiting embodiments or aspects, the method further comprises: identifying user behavior patterns using the control device to control the plurality of devices; and pre-selecting the at least one first device for monitoring user interaction based on the user behavior patterns.

According to non-limiting embodiments or aspects, provided is a system for creating a configuration for a plurality of devices, comprising at least one processor configured to: in response to user input, monitor user interaction with a control device to control each of the plurality of devices, the plurality of devices comprising at least one first device and at least one second device; record, while monitoring the user interaction with the control device, at least one configuration setting based on at least one user input provided to the control device; in response to further user input, store the at least one configuration setting in at least one memory of the control device; associate a plurality of configuration settings with a scene object, the plurality of configuration settings based on a plurality of user inputs and comprising the at least one configuration setting; and in response to activation of the scene object via the control device, transmit a plurality of control signals, the plurality of control signals based on the plurality of configuration settings and configured to control the plurality of devices.

In non-limiting embodiments or aspects, the at least one processor is further configured to: create, on a mobile device separate from the control device, an identifier for the plurality of configuration settings; and in response to creating the identifier, automatically activate a user interface on the control device. In non-limiting embodiments or aspects, the at least one processor is further configured to determine a plurality of devices in communication with the control device. In non-limiting embodiments or aspects, the at least one processor is further configured to: display a plurality of user interfaces configured to control the plurality of devices. In non-limiting embodiments or aspects, the user input comprises activation of a recording option on a user interface of the control device. In non-limiting embodiments or aspects, the further user input comprises activation of the recording option or a second recording option on the user interface of the control device. In non-limiting embodiments or aspects, the plurality of configuration settings are recorded as a sequence based on an order of the plurality of user inputs, and the plurality of control signals are transmitted based on the sequence. In non-limiting embodiments or aspects, the at least one first device comprises a stateful device configured for bidirectional communication with the control device.

In non-limiting embodiments or aspects, the at least one processor is further configured to: after associating the plurality of configuration settings with the scene object, adjust at least one configuration setting based on further user input on the control device. In non-limiting embodiments or aspects, the at least one processor is further configured to: display, on the control device while recording the plurality of user inputs, a communication error notification based on detecting a network disruption; and stop recording the plurality of user inputs based on detecting the network disruption. In non-limiting embodiments or aspects, the plurality of user inputs are input via a first user interface and a second user interface, the first user interface is configured to control the at least one first device, and the second user interface is configured to control the at least one second device. In non-limiting embodiments or aspects, the at least one processor is further configured to: determine that the at least one first device and the at least one second device have been used together based on a usage pattern; and in response to determining that the at least one first device and the at least one second device have been used together based on the usage pattern, automatically display, on the control device, a second user interface configured to control both the at least one first device and the at least one second device. In non-limiting embodiments or aspects, the control device comprises a remote control device comprising a touch screen, the remote control device configured to transmit control signals via at least one of infrared and radio frequencies. In non-limiting embodiments or aspects, the at least one first device comprises a lighting device, and the at least one configuration setting for the lighting device comprising a setting of at least one of an intensity and color.

In non-limiting embodiments or aspects, the scene object is displayed in a scrollable list among a plurality of scene objects, wherein each scene object is displayed with a name and a graphical icon. In non-limiting embodiments or aspects, the plurality of configuration settings are recorded based on a state or setting of a device of the plurality of devices detected independently from the plurality of user inputs. In non-limiting embodiments or aspects, the at least one processor is further configured to display a visual indicator when recording the plurality of configuration settings. In non-limiting embodiments or aspects, the at least one processor is further configured to: identify user behavior patterns using the control device to control the plurality of devices; and pre-select the at least one first device for monitoring user interaction based on the user behavior patterns.

According to non-limiting embodiments or aspects, provided is a computer-program product for creating a configuration for a plurality of devices, comprising at least one non-transitory computer-readable medium including program instructions that, when executed by at least one processor, cause the at least one processor to: in response to user input, monitor user interaction with a control device to control each of the plurality of devices, the plurality of devices comprising at least one first device and at least one second device; record, while monitoring the user interaction with the control device, at least one configuration setting based on at least one user input provided to the control device; in response to further user input, store the at least one configuration setting in at least one memory of the control device; associate a plurality of configuration settings with a scene object, the plurality of configuration settings based on a plurality of user inputs and comprising the at least one configuration setting; and in response to activation of the scene object via the control device, transmit a plurality of control signals, the plurality of control signals based on the plurality of configuration settings and configured to control the plurality of devices.

Further non-limiting aspects or embodiments are set forth in the following numbered clauses:

Clause 1: A computer-implemented method for creating a configuration for a plurality of devices, comprising: in response to user input, monitoring user interaction with a control device to control each of the plurality of devices, the plurality of devices comprising at least one first device and at least one second device; recording, while monitoring the user interaction with the control device, at least one configuration setting based on at least one user input provided to the control device; in response to further user input, storing, with the control device, the at least one configuration setting in at least one memory of the control device; associating a plurality of configuration settings with a scene object, the plurality of configuration settings based on a plurality of user inputs and comprising the at least one configuration setting; and in response to activation of the scene object via the control device, transmitting a plurality of control signals, the plurality of control signals based on the plurality of configuration settings and configured to control the plurality of devices.

Clause 2: The computer-implemented method of clause 1, further comprising: creating, on a mobile device separate from the control device, an identifier for the plurality of configuration settings; and in response to creating the identifier, automatically activating a user interface on the control device.

Clause 3: The computer-implemented method of clauses 1 or 2, further comprising determining a plurality of devices in communication with the control device.

Clause 4: The computer-implemented method of any of clauses 1-3, further comprising displaying a plurality of user interfaces configured to control the plurality of devices.

Clause 5: The computer-implemented method of any of clauses 1-4, wherein the user input comprises activation of a recording option on a user interface of the control device.

Clause 6: The computer-implemented method of any of clauses 1-5, wherein the further user input comprises activation of the recording option or a second recording option on the user interface of the control device.

Clause 7: The computer-implemented method of any of clauses 1-6, wherein the plurality of configuration settings are recorded as a sequence based on an order of the plurality of user inputs, and wherein the plurality of control signals are transmitted based on the sequence.

Clause 8: The computer-implemented method of any of clauses 1-7, wherein the at least one first device comprises a stateful device configured for bidirectional communication with the control device.

Clause 9: The computer-implemented method of any of clauses 1-8, further comprising: after associating the plurality of configuration settings with the scene object, adjusting at least one configuration setting based on further user input on the control device.

Clause 10: The computer-implemented method of any of clauses 1-9, further comprising: displaying, on the control device while recording the plurality of user inputs, a communication error notification based on detecting a network disruption; and stopping recording the plurality of user inputs based on detecting the network disruption.

Clause 11: The computer-implemented method of any of clauses 1-10, wherein the plurality of user inputs are input via a first user interface and a second user interface, wherein the first user interface is configured to control the at least one first device, and wherein the second user interface is configured to control the at least one second device.

Clause 12: The computer-implemented method of any of clauses 1-11, further comprising: determining that the at least one first device and the at least one second device have been used together based on a usage pattern; and in response to determining that the at least one first device and the at least one second device have been used together based on the usage pattern, automatically displaying, on the control device, a second user interface configured to control both the at least one first device and the at least one second device.

Clause 13: The computer-implemented method of any of clauses 1-12, wherein the control device comprises a remote control device comprising a touch screen, the remote control device configured to transmit control signals via at least one of infrared and radio frequencies.

Clause 14: The computer-implemented method of any of clauses 1-13, wherein the at least one first device comprises a lighting device, and wherein the at least one configuration setting for the lighting device comprises a setting of at least one of an intensity and color.

Clause 15: The computer-implemented method of any of clauses 1-14, wherein the scene object is displayed in a scrollable list among a plurality of scene objects, wherein each scene object is displayed with a name and a graphical icon.

Clause 16: The computer-implemented method of any of clauses 1-15, wherein the plurality of configuration settings are recorded based on a state or setting of a device of the plurality of devices detected independently from the plurality of user inputs.

Clause 17: The computer-implemented method of any of clauses 1-16, further comprising displaying a visual indicator when recording the plurality of configuration settings.

Clause 18: The computer-implemented method of any of clauses 1-17, further comprising: identifying user behavior patterns using the control device to control the plurality of devices; and pre-selecting the at least one first device for monitoring user interaction based on the user behavior patterns.

Clause 19: A system for creating a configuration for a plurality of devices, comprising at least one processor configured to: in response to user input, monitor user interaction with a control device to control each of the plurality of devices, the plurality of devices comprising at least one first device and at least one second device; record, while monitoring the user interaction with the control device, at least one configuration setting based on at least one user input provided to the control device; in response to further user input, store the at least one configuration setting in at least one memory of the control device; associate a plurality of configuration settings with a scene object, the plurality of configuration settings based on a plurality of user inputs and comprising the at least one configuration setting; and in response to activation of the scene object via the control device, transmit a plurality of control signals, the plurality of control signals based on the plurality of configuration settings and configured to control the plurality of devices.

Clause 20: The system of clause 19, wherein the at least one processor is further configured to: create, on a mobile device separate from the control device, an identifier for the plurality of configuration settings; and in response to creating the identifier, automatically activate a user interface on the control device.

Clause 21: The system of clauses 19 or 20, wherein the at least one processor is further configured to determine a plurality of devices in communication with the control device.

Clause 22: The system of any of clauses 19-21, wherein the at least one processor is further configured to: display a plurality of user interfaces configured to control the plurality of devices.

Clause 23: The system of any of clauses 19-22, wherein the user input comprises activation of a recording option on a user interface of the control device.

Clause 24: The system of any of clauses 19-23, wherein the further user input comprises activation of the recording option or a second recording option on the user interface of the control device.

Clause 25: The system of any of clauses 19-24, wherein the plurality of configuration settings are recorded as a sequence based on an order of the plurality of user inputs, and wherein the plurality of control signals are transmitted based on the sequence.

Clause 26: The system of any of clauses 19-25, wherein the at least one first device comprises a stateful device configured for bidirectional communication with the control device.

Clause 27: The system of any of clauses 19-26, wherein the at least one processor is further configured to: after associating the plurality of configuration settings with the scene object, adjust at least one configuration setting based on further user input on the control device.

Clause 28: The system of any of clauses 19-27, wherein the at least one processor is further configured to: display, on the control device while recording the plurality of user inputs, a communication error notification based on detecting a network disruption; and stop recording the plurality of user inputs based on detecting the network disruption.

Clause 29: The system of any of clauses 19-28, wherein the plurality of user inputs are input via a first user interface and a second user interface, wherein the first user interface is configured to control the at least one first device, and wherein the second user interface is configured to control the at least one second device.

Clause 30: The system of any of clauses 19-29, wherein the at least one processor is further configured to: determine that the at least one first device and the at least one second device have been used together based on a usage pattern; and in response to determining that the at least one first device and the at least one second device have been used together based on the usage pattern, automatically display, on the control device, a second user interface configured to control both the at least one first device and the at least one second device.

Clause 31: The system of any of clauses 19-30, wherein the control device comprises a remote control device comprising a touch screen, the remote control device configured to transmit control signals via at least one of infrared and radio frequencies.

Clause 32: The system of any of clauses 19-31, wherein the at least one first device comprises a lighting device, and wherein the at least one configuration setting for the lighting device comprising a setting of at least one of an intensity and color.

Clause 33: The system of any of clauses 19-32, wherein the scene object is displayed in a scrollable list among a plurality of scene objects, wherein each scene object is displayed with a name and a graphical icon.

Clause 34: The system of any of clauses 19-33, wherein the plurality of configuration settings are recorded based on a state or setting of a device of the plurality of devices detected independently from the plurality of user inputs.

Clause 35: The system of any of clauses 19-34, wherein the at least one processor is further configured to display a visual indicator when recording the plurality of configuration settings.

Clause 36: The system of any of clauses 19-35, wherein the at least one processor is further configured to: identify user behavior patterns using the control device to control the plurality of devices; and pre-select the at least one first device for monitoring user interaction based on the user behavior patterns.

Clause 37: A computer-program product for creating a configuration for a plurality of devices, comprising at least one non-transitory computer-readable medium including program instructions that, when executed by at least one processor, cause the at least one processor to: in response to user input, monitor user interaction with a control device to control each of the plurality of devices, the plurality of devices comprising at least one first device and at least one second device; record, while monitoring the user interaction with the control device, at least one configuration setting based on at least one user input provided to the control device; in response to further user input, store the at least one configuration setting in at least one memory of the control device; associate a plurality of configuration settings with a scene object, the plurality of configuration settings based on a plurality of user inputs and comprising the at least one configuration setting; and in response to activation of the scene object via the control device, transmit a plurality of control signals, the plurality of control signals based on the plurality of configuration settings and configured to control the plurality of devices In one non-limiting embodiment, a system real-time creation of a home scene during use of a control device to operate a plurality of devices. The system comprises a scene recording module coupled to the control device and configured to generate at least one scene object operable to form a communication link to control a first device of the plurality of devices, wherein the control device is operable to activate recording of the at least one scene object and operate the first device via a first user interface, the scene recording module configured to record real-time adjustment of operating settings of the first device; and a scene recording engine coupled to the scene recording module and configured to associate the recorded operating settings of the first device with the at least one scene object.

In another non-limiting embodiment, a method for real-time creation of a home scene during use of a control device to operate a plurality of devices. The method comprises generating, via a scene recording module, at least one scene object operable to form a communication link to control a first device of the plurality of devices; activating, via the control device, recording of the at least one scene object and operating the first device via a first user interface; recording, via the scene recording module, real-time adjustment of operating settings of the first device; and associating, via a scene recording engine coupled to the scene recording module, the recorded operating settings of the first device with the at least one scene object.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 13 displays illustrations of a series of screenshots of the plurality of user interfaces stored within the primary interface layer and the secondary interface layer and displayed on the control device during programming of one of the plurality of scene objects during real-time use of respective ones of the devices, according to one illustrated and non-limiting embodiment.

DETAILED DESCRIPTION

Figure 1A:
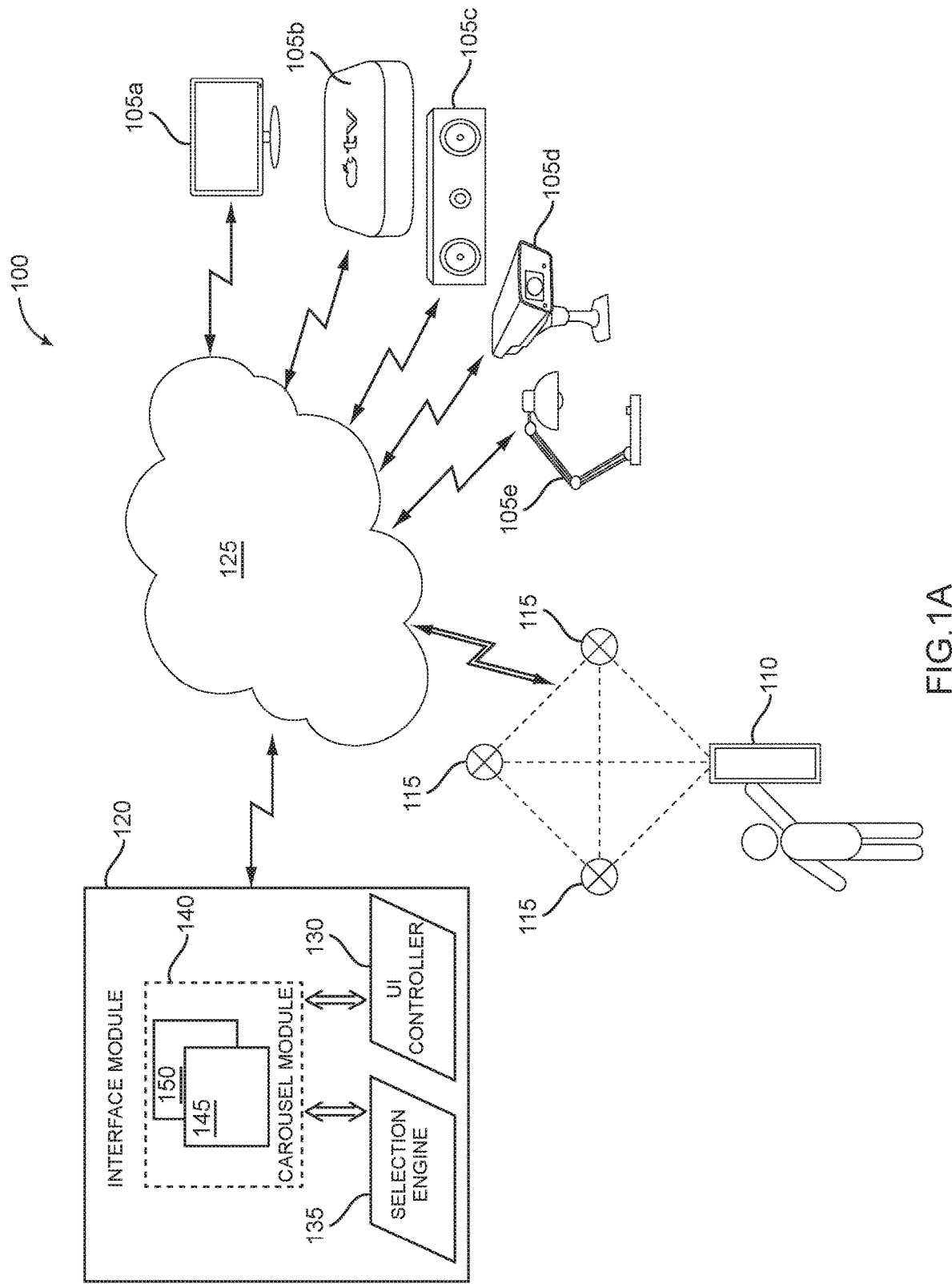
FIG. 1A is a schematic illustration of a system for controlling a plurality of devices via a control device, according to one illustrated and non-limiting embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various examples of embodiments of the invention will now be described. The following description provides specific details for a thorough understanding and enabling description of these examples. One skilled in the relevant art will understand, however, that embodiments of the invention may be practiced without many of these details. Likewise, one skilled in the relevant art will also understand that embodiments incorporate many other obvious features not described in detail herein. Additionally, some well-known structures or functions may not be shown or described in detail below, so as to avoid unnecessarily obscuring the relevant description.

The terminology used herein is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Detailed Description section.

The figures along with the following discussion provide a brief, general description of a suitable environment in which embodiments of the invention can be implemented. As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer, mainframe computer, media player, and/or the like. An "interface," "user interface" or "UI" refers to a generated display, such as one or more graphical user interfaces (GUIs) with which a user may interact, either directly or indirectly (e.g., through a keyboard, mouse, touchscreen etc.). The terms "computing device," "computer," "server," and the like are generally used interchangeably herein, and refer to any of the above devices and systems, as well as any data processor.

While non-limiting embodiments of the invention, such as certain functions, may be described as being performed on a single device, non-limiting embodiments of the invention can also be practiced in distributed environments where functions or modules are shared among disparate computing devices, which are linked through a communications network, such as, for example, a. Local Area Network (LAN), Wide Area Network (WAN), the Internet, Bluetooth®, Zigbee®, and/or the like. In a distributed computing environment, program modules may be located in both local and remote memory storage devices.

Non-limiting embodiments of the invention may be stored or distributed on tangible computer-readable media, including magnetically or optically readable computer discs, cloud servers, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of non-limiting embodiments of the invention may be distributed over the Internet and via cloud computing networks or on any analog or digital network (packet switched, circuit switched, or other scheme).

The computer readable medium stores computer data, which data may include computer program code that is executable by a computer, in machine readable form. By way of example, a computer readable medium may comprise computer readable storage media, for tangible or fixed storage of data, or communication media for transient interpretation of code-containing signals. Computer readable storage media, as used herein, refers to physical or tangible storage (as opposed to transitory signals) and includes without limitation volatile and non-volatile, removable and non-removable media implemented in any method or technology for the tangible storage of information such as computer-readable instructions, data structures, program modules or other data. Computer readable storage media includes RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Non-limiting embodiments of the invention are described herein with reference to operational illustration of modules having functional blocks to illustrate methods employed by modules to control a plurality of smart devices via a control device where user interfaces associated with the smart devices are transitionally displayed on the control device. It will be understood that each of the modules, blocks, engines, widgets, and combinations thereof may be implemented by analog or digital hardware and computer program instructions. The computer program instructions may be provided to a processor of a general purpose computer, special purpose computer, application-specific integrated circuit (ASIC), or other programmable data processing apparatus such that the instructions, which execute via the processor of the computer or other programmable data processing apparatus, implements the functions/acts specified in the functional blocks of the flowcharts and/or the operational modules.

In some non-limiting embodiments, the methods illustrated by the functional blocks may occur out of the order noted in the operational illustration of the modules. For example, two blocks shown in succession may be executed substantially concurrently. Alternatively and/or additionally, the blocks may be executed in reverse order.

A module is a software, hardware, or firmware (or combination thereof) system, process or functionality, or component thereof, that performs or facilitates the processes, features, and/or functions described herein. A module may include sub-modules or engines. Software components of a module may be stored on a computer readable medium. Modules may be integral to one or more servers, or be loaded and executed by one or more servers. One or more modules may be grouped into an application.

FIG. 1A shows a schematic illustration of a system 100 for controlling a plurality of devices 105a-e (collectively referenced herein as 105) via a control device 110, according to one illustrated and non-limiting embodiment. The control device 110 may be a multi-purpose computing device, such as a smartphone, or may be a device purposed to be used as a control device for a plurality of different devices.

The system 100 comprises a plurality of beacons 115 communicatively coupled to each other and to the control device 110. The system 100 further includes an interface module 120 communicatively coupled to the control device 110, the plurality of beacons 115, and the plurality of devices 105 via a network 125. The network 125 may, for example, comprise a Local Area Network (LAN), Wide Area Network (WAN) and/or the like, and may include the Internet, a private network, and/or local Infrared, Bluetooth®, or Zigbee® networks, as examples.

The plurality of devices 105 may be "smart" devices such as electronic or electro-mechanical devices communicatively coupled to the network 125. In one non-limiting embodiment, the plurality of devices 105 may take the form of a smart TV 105a, set-top box 105b, sound system 105c, security camera 105d, and/or lamp 105e. Each of the plurality of devices 105 has associated plurality of user interfaces (UIs) 402 (to be described in more detail with reference to FIGS. 4A-5B) operable to control operations of the devices 105. As will be discussed in more detail below, the system 100 operates to display select ones of the plurality of UIs 402 in response to a determination of the device 105 intended for control by the control device 110. The plurality of UIs 402 are configured for display on the control device 110 to allow a user of the control device 110 to operate respective ones of the devices 105. The plurality of UIs 402 may take the form of graphical user interfaces (GUIs) advantageously configured for display on a mobile device. It will be appreciated to those of ordinary skill in the art that any type of "smart" device is contemplated by the disclosure and the examples disclosed herein are merely for illustrative purposes.

The plurality of beacons 115 are configured to communicate and operate in conjunction with the control device 110 to determine a spatial position of the control device 110 in real-time. The plurality of beacons 115 may take the form of localization units and may communicate with the control device 110 via any short-wave or long-wave communication protocol. For example, the beacons 115 may utilize environment localization chips based on ultra wideband (UWB) technology to determine relative positions in relation to one another. The localization of the beacons 115 may be implemented based on lateration, tri-lateration, or multi-lateration methods. As another example, electromagnetic field (EMF) technology is another technology capable of determining position and orientation. The same localization methods leveraged by the beacons 115 to determine relative positions may be leveraged by the system 100 to determine the location of the control device 110 relative the beacons 115. As will be described below, because the plurality of beacons 115 are associated with the control device 110, the control device 110 is capable to determine its relative position with respect to the plurality of beacons 115.

In one example non-limiting embodiment, the beacons 115 may be spatially arranged in an operating environment of the system 100 such that a line-of-site exists between the plurality of beacons 115. The beacons 115 may, for example, be mounted on a top portion of various wall surfaces to allow a substantially unobstructed communication path between the beacons 115 and between the beacons 115 and the control device 110. The plurality of beacons 115 may communicate wirelessly with one another and with the control device 110 to implement location positioning via the (JWB) communication protocols.

The control device 110 may be operable to control one or more of the plurality of devices 105 via the plurality of UIs 402. In particular, commands may be transmitted between the control device 110 and the plurality of devices 105 via at least one of infrared (IR), Bluetooth®, Zig-bee®, WiFi®, UWB, or the like. For example, the control device 110 and the plurality of devices 105 may transmit and receive commands via the network 125.

In one non-limiting embodiment, the control device 110 may take the form of a smart remote, smart phone, tablet, or any mobile computing device configured to transmit commands to the plurality of devices 105 either directly or via the network 125, The control device 110 may take the form of a universal remote configured to display respective ones of the plurality of UIs 402 associated with the plurality of devices 105. The UIs displayed on the control device 110 may be indicative of the particular one of the plurality of devices 105 the control device 110 is targeting. For example, responsive to the control device 110 pointing toward the device 105a, the UI associated with the device 105a may be displayed on the control device 105. In another non-limiting embodiment, responsive to the control device 110 pointing toward a vicinity of a first and second one of the plurality of devices 105, a first UI may be automatically displayed on the control device 110 while a second UI is available for display in response to a user input. The first UI may be the control interface associated with the first device 105a while the second UI may be the control interface associated with the second device 105b. As will be described in more detail below, the system 100 is operable to implement a Dynamic Spatial Selection Algorithm (DSSA) to determine a likelihood that the first and second devices 105a, 105b are targeted by the control device 110. In another non-limiting embodiment, (as will be referred later to a "fixed mode") the control device 110 may have all the plurality of UIs 402 respectively associated with the plurality of devices 105 available for display in response to the user input. For example, the user input may take the form of a manual gesture on the control device 110 by the user, such as a swipe, shake, or the like. The manual gesture may result in a transition between respective ones of the plurality of UIs 402 on the control device 110 regardless of a position and orientation of the control device 110.

The interface module 120 comprises a user interface (UI) controller 130, a selection engine 135, and a carousel module 140. In one non-limiting embodiment, the UI controller 130, the selection engine 135, and the carousel module 140 are remotely located and communicatively coupled to one another via a network such as Wi-Fi® or the like. The carousel module 140 further comprises a primary interface layer 145 and a secondary interface layer 150. The primary interface layer 145 is configured to store the first of the plurality of UIs 402 while the secondary interface layer 150 is configured to store at least the second UI of the plurality of UIs 402. In one non-limiting embodiment, the secondary interface layer 150 stores one or more of the plurality of UIs 402, while the primary interface layer stores the first UI. The one or more of the plurality of Us 402 stored in the secondary interface layer 150 are associated with respective ones of the plurality of devices 105 that are within a threshold proximity relative the first device 105a. In other words, the UIs of the secondary interface layer 150 are associated with those devices 105 that are in substantially close proximity to the device 105 with the first UI.

As mentioned above, the first UI in the primary interface layer 145 may be automatically displayed on the control device 110. However, the one or more of the plurality of UIs 402 in the secondary interface layer 150 may be displayed in response to manual gestures by the user on the control device 110. For example, upon display of the first UI from the primary interface layer 145, the user may input a gesture (e.g., swiping finger on display screen) via the control device 110 to indicate a request for a change in the displayed UI. In one non-limiting embodiment, the first device 105 controlled by the displayed first UI may not be the intended target of the user. In such scenario, the user may manually gesture the control device 110 to toggle between the one or more UIs in the secondary interface layer 150 until a desired UI for a particular one of the devices 105 is displayed on the control device 110.

Furthermore, the primary interface layer 145 comprises a carousel zone and a control zone. For example, a first UI of the plurality of UIs associated with a first device may be stored in the primary interface layer 145. The carousel zone may store a graphical icon associated with the first device and the control zone may store a graphical control interface associated with the first device. In such non-limiting embodiment, the UI controller 130 actuates the carousel module to display the first UI responsive to identification of the first device (as will be described in more detail below). Display of the first UI includes display of the graphical icon from the carousel zone, where the graphical control interface from the control zone is displayed responsive to the displayed graphical icon. In one example, the graphical control interface may comprise multiple user interfaces within the control zone that may be manually scrolled through by the user. For example, for a smart TV device, the control zone may be a transitional graphical control interface that automatically or manually transitions between various portions of the graphical control interface as displayed on the control device 110.

The UI controller 130 is configured to actuate display on the control device 110 of select ones of the plurality of UIs 402 associated with respective ones of the plurality of devices 105. The plurality of UIs 402 are operable to control operation of the plurality of devices 105 by having one or more input settings pertaining to respective ones of the devices 105. For example, the input settings for a particular one of the UIs may include volume, channel, light intensity, ride sharing request button, or the like. It will be appreciated by those of ordinary skill in the art that any type of input settings is contemplated by this disclosure and the examples provided herein are merely for purposes of illustrating functionality of the system 100 and its components.

In particular, the UI controller 130 may actuate the carousel module 140 to display the UI stored within the primary interface layer 145 and actuates display of one or more UIs stored in the secondary interface layer 150 responsive to the user command via the control device 110. The user command may, for example, be a swiping gesture or any other physical interaction of the user with the control device 110.

The UI controller 130 may be communicatively coupled to the control device 110 to cause display of the first UI in response to a determination by the system 100 that the first device 105a is targeted for control by the control device 110. Furthermore, responsive to the control device 110 being in a "point and control" and the control device 110 pointing toward a vicinity of both the first and second devices 105a, 105b, the UI controller 130 initially actuates display of the first UI on the control device 110 while the UI controller 130 makes the second UI available for display on the control device 110. As will be described in more detail below, the first device 105a may have the greatest likelihood of being the intended targeted device 105 while the second device 105b has the second highest likelihood of being the intended targeted device.

The selection engine 135 is communicatively coupled to the carousel module 140, the UI controller 130, and the control device 110. The selection engine 135 is configured to define a spatial selection zone Z (FIG. 2) based on a location and orientation of the control device 110. The spatial selection zone Z includes a plurality of spatial coordinates having associated selection probabilities. The selection engine 135 is further configured to identify the first device 105a of the plurality of devices 105 located at a first one of the plurality of spatial coordinates having a first probability value. Additionally, the selection engine 135 is configured to identify the second device 105b located at a second one of the plurality of spatial coordinates having a second probability value of the selection probabilities. In one example, the second probability value is less than the first probability value. The selection probabilities refer to a probabilistic likelihood that a respective device 105 located in a particular spatial coordinate of the plurality of spatial coordinates was intended for control by the control device 110. It will be appreciated by those of ordinary skill in the art that more than the first and second devices 105a, 105b may be identified by the selection engine 135 within the spatial selection zone Z. The control device 110 may vary in location and orientation during use by the user. For each location and orientation of the control device 110, the selection engine 135 may determine the associated spatial selection zone Z.

In one non-limiting embodiment, the selection engine 135 may identify all respective ones of the plurality of devices 105 that are within the spatial selection zone Z having a probability value within a defined probability threshold. For example, the selection engine 100 may operate to identify the spatial coordinates having probability values greater than a defined probability threshold (e.g., greater than 0.4). Then, each of the plurality of devices 105 having spatial coordinates or regions R (to be describe in more detail herein) that overlap with the identified spatial coordinates are classified as potential intended targeted devices 105 for control by the control device 110. In response to such determination, the carousel module 140 operates to store associated UIs of the potential targeted devices 105. In particular, the UI of the first device 105a mapped to the spatial coordinate with the highest probability value may be stored in the primary interface layer 145, while the UIs of remaining devices classified as potential target devices 105 are stored in the secondary interface layer 150. The UI controller 130 may automatically actuate display of the first UI from the primary interface layer 145, while actuating display of the UIs stored in the secondary interface layer 150 in response to the user's gesture (e.g., finger swipe on a display of the control device 110). Additional details of the spatial selection zone Z and the UI display based on selection probabilities will be described below with reference to FIGS. 2 and 4.

Figure 1B:
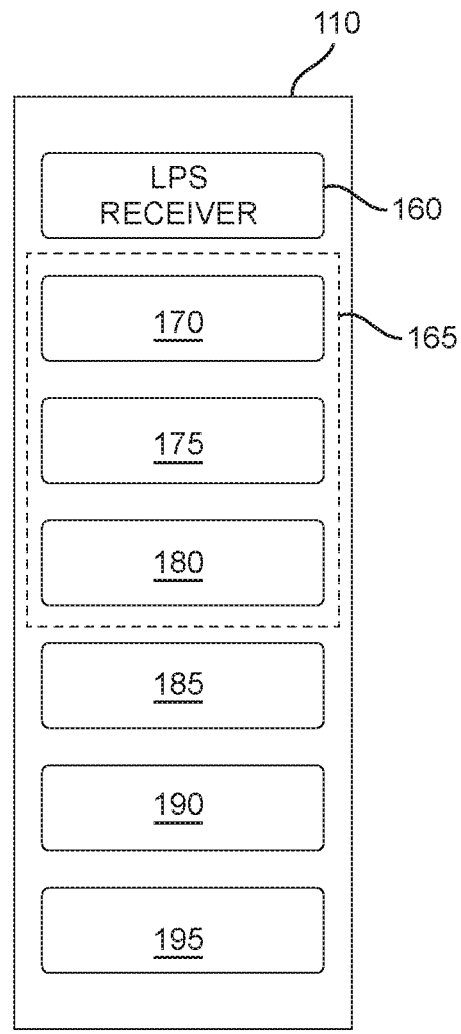
FIG. 1B is a block diagram illustrating a location positioning system (LPS) receiver and an inertial measurement unit embedded within the control device, according to one illustrated and non-limiting embodiment.

FIG. 1B shows a block diagram illustrating a local positioning system (LPS) receiver 160, an inertial measurement unit (IMU) 165, a distance sensor 185, an infrared (IR) transmitter 190, and a wireless transceiver 195 embedded within the control device 110, according to one illustrated and non-limiting embodiment.

The control device 110 may be a single remote control that operates as a universal controller for the plurality of devices 105, In some non-limiting embodiments, the control device 110 may take the form of a smart phone, tablet computer, wearable computing device, remote control, or any computing device. The control device 110 is configured to display selective ones of the plurality of UIs 402 to control the plurality of devices 105. The respective ones of the plurality of UIs 402 selected for display on the control device 110 and/or for storage in the primary interface layer 145 and the secondary interface layer 150 is at least partially based on the selection zone determination by the selection engine 135. As mentioned above, the spatial selection zone Z is dynamically updated based on the real-time position and orientation of the control unit 110. Such real-time position and orientation information is calculated based, at least in part, on one or more of the LPS receiver 160, the IMU 165, the distance sensor 185, the IR transmitter 190, and the wireless transceiver 195 of the control device 110.

The LPS receiver 160 may, for example, be leveraged for indoor localization technologies such as an ultra-wideband (UWB) or electro-magnetic field (EMF), The LPS receiver 160 used in UWB technology makes it possible to geolocate items indoors with an accuracy of the order of a few centimeters to a few tenths of a centimeter. The UWB technology may be capable of determining position in the order of 2.5 to 5 meters. The LPS receiver 160 may be in communication with the plurality of beacons 115, where the plurality of beacons 115 may utilize localization chips based on the UWB technology. As such, the plurality of beacons 115 may communicate wirelessly between each other and with the control device 110 to implement the local positioning system 100 using, for example, UWB technology. The localization of the beacons 115 may also be implemented based on lateration, tri-lateration, or multi-lateration techniques. It will be appreciated by those of ordinary skill in the art that the communication technology employed by the beacons 115 and the control unit 110 may include any other technology. As will be described in more detail below, because the control device 110 may be associated with the plurality of beacons 115, the control device 110 may leverage the known positioning of the beacons 115 to identify its own position relative the beacons 115.

The IMU 165 may, for example, comprise one or more of a magnetometer 170, gyroscope 175, and accelerometer 180. The IMU 165 is configured to capture physical variables of the control device 110 in space and thus orientation. Capturing various physical variables of the control device 110 in space may advantageously improve accuracy of the orientation determination of the control device 110. The physical variables may, for example, be captured by one or more of the magnetometer 170, gyroscope 175, and accelerometer 180. The magnetometer 170 may be used in the local positioning system 100 when the EMF technology is leveraged. The magnetometer 170 may detect the direction, strength, or relative change of a magnetic field at the control device 110. The gyroscope 175 may additionally be leveraged for measuring or maintaining orientation and angular velocity of the control device 110. Finally, the accelerometer 180 may measure translational acceleration along three axes as well as rotation about the three axes.

The IR transmitter 190 and the wireless transceiver 195 may be leveraged by the control device 110 to transmit commands to the plurality of devices 105. For example, the control device 110 may transmit commands to the devices 105 via the IR transmitter 190 using IR communication protocols. In another example, the wireless transceiver 195 may be leveraged to transmit commands via. Bluetooth®, Zigbee®, Wi-Fi®, UWB, or the like.

Various methods for determining the position of the control device 110 are contemplated by the disclosure. In a first non-limiting embodiment, a travel time of a radio signal between the control device 110 and the plurality of beacons 115 may be determined. For example, a technique of radio signal time of arrival (TOA) or time differences of arrival (e.g., TDOA) may be implemented. Alternatively and/or additionally, another non-limiting embodiment includes calculating received power of a radio signal at the control device 110 or at the beacons 115. Alternatively and/or additionally, a further non-limiting embodiment includes determining angles of reception of the radio signals received at the control device 110 or at least one of the plurality of beacons 115. The angle of reception may advantageously allow for implementation of a triangulation by using at least one of the beacons 115. Alternatively and/or additionally, in yet another non-limiting embodiment, a measurement of electromagnetic fields at the control device 110 or at least one of the beacons 115 may be determined. Coupling the above positioning methods together with the captured physical variables of the control device 110 via the IMU 165, the position and orientation of the control device 110 may be identified.

Figure 2:
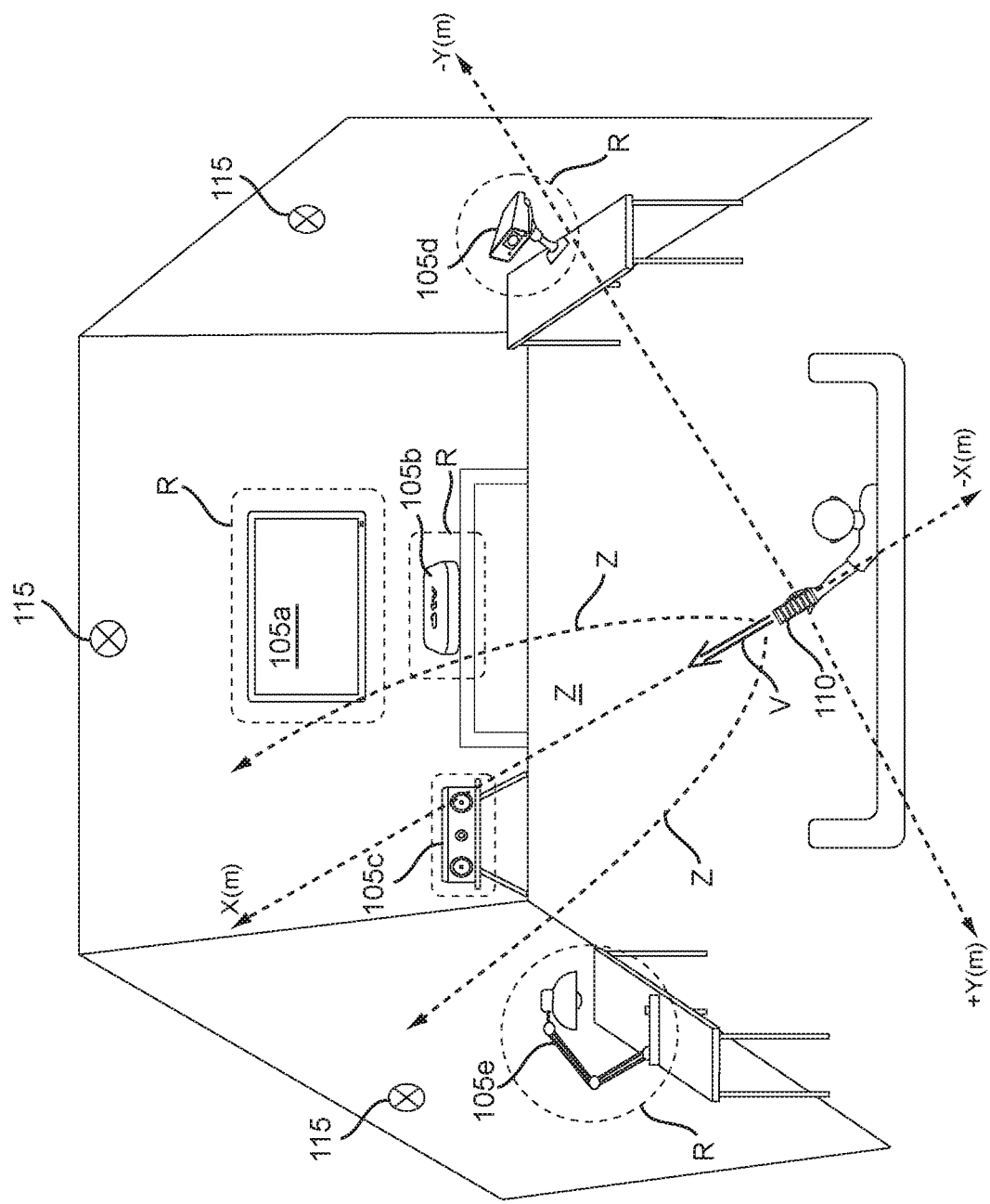
FIG. 2 is an example illustration of a spatial selection zone within an operating environment of the system, according to one illustrated and non-limiting embodiment.

FIG. 2 is an example illustration of the spatial selection zone Z within an operating environment of the system, according to one illustrated and non-limiting embodiment.

The interface module 120 may leverage the above positioning and orientation measurement methodologies to identify a region R for each of the devices 105. The region R may comprise a spatial area or volume associated with a particular one of the devices 105. A position of each of the plurality of devices 105 may also be identified by leveraging the ability to identify the location of the control device 110, In one non-limiting embodiment, the control device 110 may be placed in proximity with respective ones of the devices 105. When placed in proximity, the interface module 120, communicatively coupled to the beacons 115 and the control device 110, may identify the region R associated with the particular device 105. For example, the user of the control device 110 may indicate to the system 100 that implementation of defining the region R for one of the devices 105 will begin. As such, the interface module 120 may map the determined location of the control device 110 as the region R for the particular device 105. This methodology may be repeated for each of the plurality of devices 105. As such, the interface module 120 may store a mapping of the plurality of devices 105 with associated regions R.

In another non-limiting embodiment, the regions R associated with the devices 105 may or may not be a mirror of a respective device's 105 physical location. The regions R may encompass a spatial volume or area that is greater or less than the size of the actual device 105. For example, the user may bring the control device 110 to a location adjacent the desired device 105 to be mapped in the system 100. The adjacent location may be a desired distance away from the actual device 105 to be mapped. In one non-limiting embodiment, the control device 110 may be moved to multiple corners of the desired device 105 such that the interface module 120 creates the region R within the actual physical boundaries of the device 105 itself. In another non-limiting embodiment, the interface module 110 may be programmed to create a buffer zone outside the actual physical boundaries of the device 105 being mapped (as illustrated in FIG. 2). It will be appreciated by those of ordinary skill in the art that the above method may be implemented to create the regions R at any desired location of the user, irrespective of the actual physical location of the device 105 being mapped into the interface module 120 of the system 100.

For example, the user may wish to create the region R for a particular device 105 at an upstairs location (e.g., a space on an upstairs wall, window, doorway, refrigerator, etc.) where the user frequents on a more regular basis, while the device 105 is physically located at a downstairs location. As another example, the user may wish to associate the region R of a particular device 105 with an entire wall area. As an alternative example, where multiple devices 105 are substantially proximate the other, the user may cause the system 100 to define the respective regions R for each of those proximate devices 105 more narrowly. In other words, regions R associated with such devices 105 may be substantially the same size of the physical devices 105 or less than the actual physical size of the devices 105. Furthermore, it will be appreciated that the regions R described herein may be of two-dimensional (2D) space or three-dimensional (3D) space.

The interface module 120 may be communicatively coupled to the control device 110 and/or the plurality of beacons 115. The interface module 120 may extrapolate from the real-time positioning and orientation measurements of the control device 110 a selection zone vector V representing a defined distance and direction from the control device 110. The selection zone vector V may, for example, point outwardly in one direction from a point on the control device 110. Based on the selection zone vector V, the interface module 120 may further extrapolate the spatial selection zone Z. The spatial selection zone Z may comprise a spatial area surrounding the selection zone vector V. For example, the zone may be a 2D or 3D spatial field encompassing a defined distance around the selection zone vector V. As illustrated in FIG. 2, the spatial selection zone Z of the control device 110, at the captured moment in time, is highlighted by parabolic dotted arrows stemming from the control device 110 and extending along a positive X(m) axis of the vector V, as well as extending around the +Y(m) and −Y(m) axes of both sides of the vector V. Although a parabolic shaped selection zone Z is illustrated and referred to herein, the selection zone Z may encompass any function or shape (e.g., circle, square, etc.). Additionally, it will be noted that the extrapolation of the spatial selection zone Z based on the position and orientation of the control device 110 may be a defined extrapolation. The extrapolation may be dynamically refined during subsequent operation of the system 100. In one non-limiting embodiment, as the user manipulating the control device 110 becomes more accurate over time, the system 100 may dynamically alter the extrapolation technique to define the spatial selection zone Z. An as example, if the user becomes more accurate at pointing to a target device 105, the system 100 may extrapolate the spatial selection zone Z as having smaller variations around the +X(m) axis to encompass a more narrow spatial volume.

Figure 3:
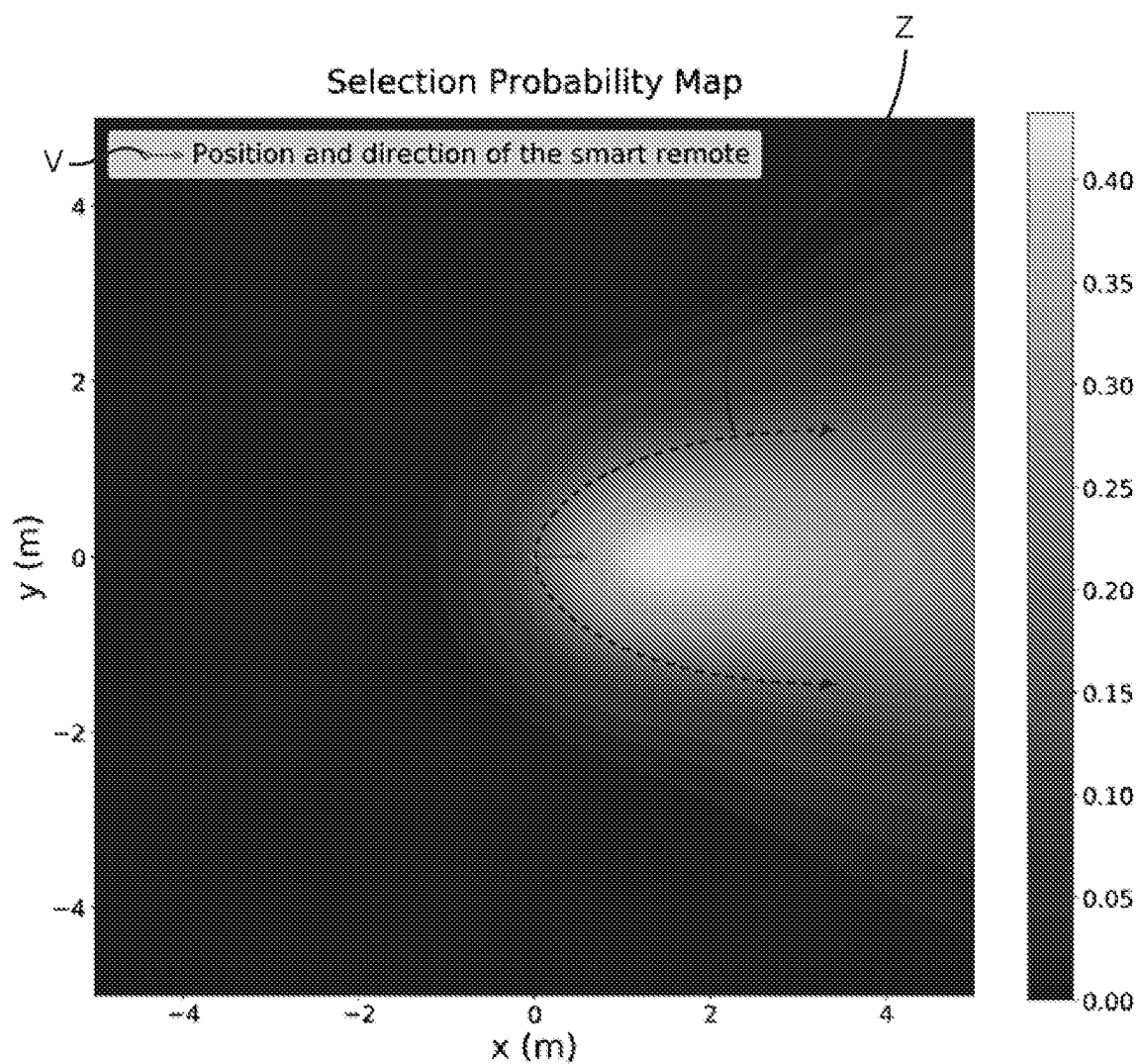
FIG. 3 is an example illustration of a selection probability map for the spatial selection zone associated with a particular location and orientation of the control device, according to one illustrated and non-limiting embodiment.

FIG. 3 shows an example illustration of a selection probability map for the spatial selection zone Z associated with a particular location and orientation of the control device 110, according to one illustrated and non-limiting embodiment.

The spatial selection zone Z is dynamically updated as the control device 110 being operated moves in space, in response to the user movement. As mentioned above, the selection engine 135 is configured to define the spatial selection zone Z based on the location and orientation of the control device 110. The spatial selection zone includes the plurality of spatial coordinates having associated selection probabilities. The selection probabilities refer to a probabilistic likelihood that the respective device 105 located in a particular spatial coordinate (e.g., X,Y or X,Y,Z) of the plurality of spatial coordinates was intended for control by the control device 110. Said differently, the plurality of spatial coordinates (e.g., 3D or 2D coordinates) comprise points in space having variable likelihoods that a particular point in space is being pointed at by the control device 110. In the example illustration of FIG. 3, portions of the spatial selection zone Z having highest probability appear in a first shading (e.g., a yellow color shading) while portions of the spatial selection zone Z having substantially zero probability appear in a second sharing (e.g., a purple color shading). It will be appreciated that the black and white version of FIG. 3 may illustrate the high probability areas approaching a white or light grey color, while the lower probability areas approach a dark color. In one example, a probability value greater than 0.4 may be considered highly likely, while a probability value less than 0.2 may be deemed highly unlikely. Of course, it will be appreciated by those of ordinary skill in the art that the exact probabilistic values may be different and the considerations for areas being deemed likely and unlikely targets may vary.

In response to real-time determination of the spatial selection zone Z, the interface module 120 may determine whether any of the regions R, having been mapped to respective devices 105, are encompassed at least in part within the spatial selection zone Z. If a single one of the devices 105 are at least partially encompassed in the selection zone Z, then the UI associated with that device 105 is automatically displayed on the control device 110. In the FIG. 2 illustration, if the control device 110 were pointing directly toward the lamp device 105*e*, then the UI 402*d* associated with controlling the lamp device 105*e* may be displayed on the control device 110.

In an alternative non-limiting embodiment, there may be more than one device 105 located within the spatial selection zone Z. Such non-limiting embodiment is highlighted in FIG. 2. The regions R associated with the devices 105 may have been mapped in the interface module 120, for example, by the selection engine 135. The selection engine 135 may identify, in real-time, the three regions 1Z associated with the devices 105*c*, 105*a*, and 105*b* as being at least partially included within the spatial selection zone Z. In response to such determination, the selection engine 135 may determine the probability values associated with each of the devices 105*c*, 105*a*, and 105*b*. In particular, the spatial coordinates of the regions R associated with the devices 105*c*, 105*a*, and 105*b* may be identified in the spatial selection zone Z. As such, the probability values associated with the particular spatial coordinates are identified by the selection engine 135 and used to stack rank the devices 105*c*, 105*a*, and 105*b* based on likelihood of intended selection by the user. The selection engine 135 may identify a first device D1 having highest likelihood of intended selection as being the device 105*c*, while a second device D2 having a second highest likelihood of intended selection as being the device 105*b*. Alternatively and/or additionally, a third device D3 having a third highest likelihood of intended selection may be determined. For example, in the FIG. 2 example, the third device D3 may comprise the device 105*a*.

As described above, the first UI 402*a* associated with the first device D1 may be stored in the primary interface layer 145 of the carousel module 140. On the other hand, the second device D2 and the third device D3 may have the respective second and third UIs 402*b*, 402*c* stored in the secondary interface layer 150.

According to one non-limiting embodiment, the UI controller 130 may actuate the carousel module 140 to display the first UI 402*a* (associated with the first device D1) stored within the primary interface layer 145 on the control device 110. The display of the first UI 402*a* on the control device 110 may occur in response to identification of the first device D1 having a first value equating to the highest probability value of all selection probabilities. Furthermore, the UI controller 130 may actuate alternate display of the second and third UIs 402*b*, 402*c* (associated with the second device D2 and the third device D3, respectively) stored in the secondary interface layer 150 on the control device 110. In particular, as will be described in more detail below, the second UI 402*b* or the third UI 402*c* may be alternately displayed on the control device 110 responsive to the user command via the control device 110. In particular, upon initial display of the first UI 402*a* on the control device 110, the user may effectively override the displayed first UI 402*a* with the second UI 402*b* or the third UI 402*c* by way of the user command. The user command may, for example, be a swiping gesture or any other physical interaction of the user with the control device 110. In such example, the user may desire to override the first UI 402*a* with either the second or third UIs 402*b*, 402*c* because the intended target device 105 to be controlled may have been the second device D2 or the third device D3. The second device D2 and/or the third device D3 may be in substantially close proximity to the first device D1. For example, the second device D2 and the third device D3 may have associated second and third selection probability values that are within a defined threshold variance from the first probability value associated with the first device D1. In some non-limiting embodiments, the defined threshold probability variance between devices within proximity of the other may be defined by the user or automatically set by the system 100.

It will be appreciated by those of ordinary skill in the art, that the secondary interface layer 150 may include any number of UIs 402 associated with further devices 105. The number of UIs stored in the secondary interface layer 150 for display on the control device 110 in response to the user gesture depends on the defined threshold probability variance between the first device D1 and other devices 105. For example, responsive to the defined probability variance being substantially high, there may be a large number of device UIs included within the secondary interface layer 150. On the other hand, a low defined probability variance may amount to only a small number of device UIs being included within the secondary interface layer 150.

Figure 4A:
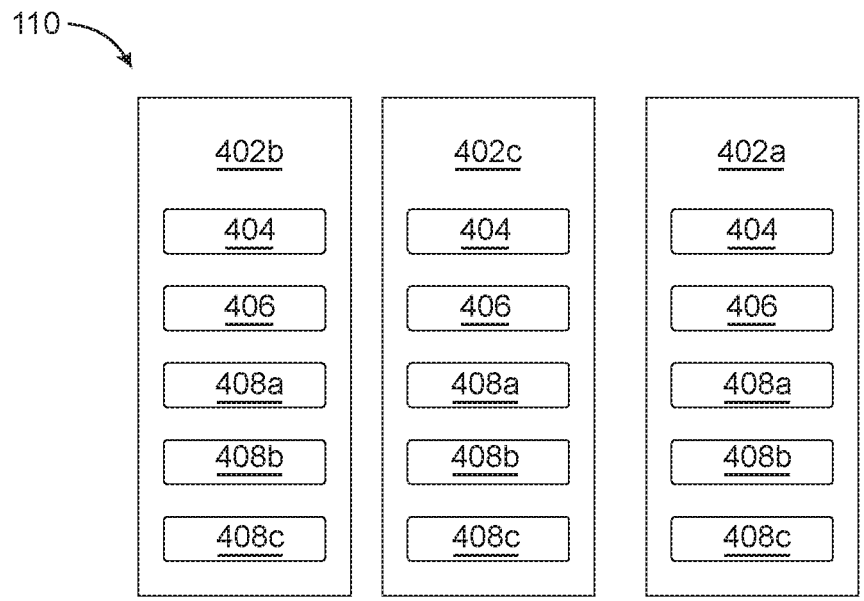
FIG. 4A is a schematic illustration of a plurality of user interfaces stored within a primary interface layer and a secondary interface layer of the carousel module, according to one illustrated and non-limiting embodiment.
Figure 4B:
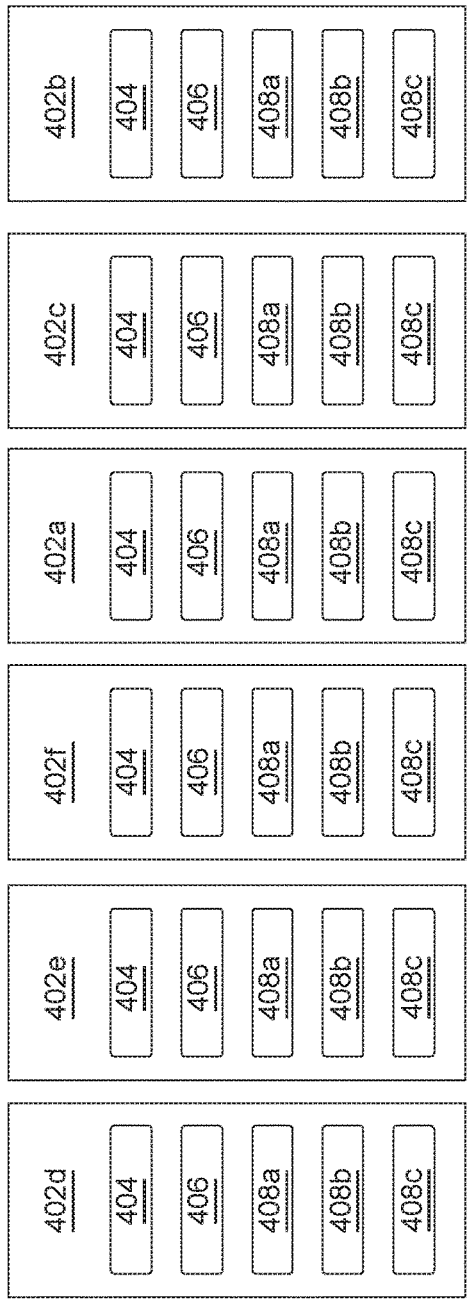
FIG. 4B is a schematic illustration of a plurality of user interfaces stored within the carousel module is in "fixed" mode, according to one illustrated and non-limiting embodiment.

FIG. 4A shows a schematic illustration of a plurality of user interfaces 402*a-c* (collectively referenced 402) stored within the primary interface layer 145 and the secondary interface layer 150 of the carousel module 140, according to one illustrated and non-limiting embodiment. FIG. 4B is a schematic illustration of the plurality of user interfaces 402*a-f* (also collectively referenced 402) stored within the carousel module 140 while the carousel module 140 is in "fixed" mode, according to one illustrated and non-limiting embodiment.

As mentioned above, the UI controller 130 is configured to actuate display on the control device 110 of select ones of the plurality of UIs 402 associated with respective ones of the plurality of devices 105. The plurality of UIs 402 are operable to control operation of the plurality of devices 105 by having one or more input elements or settings pertaining to respective ones of the devices 105. In one non-limiting embodiment, respective ones of the plurality of interfaces 402 may include data and interface modules implemented as graphical user interfaces configured to invoke control functions of the associated plurality of devices 105. Each of the interfaces 402 may comprise a label module 404 configured to communicate the particular device 105 being controlled by the control device 110 and/or a subset of interface functions included in the respective interface 402. In the FIG. 4A illustrated examples, the label modules 404 of the UIs 402b, 402c, 402a respectively indicate an APPLE® TV device, Samsung® Smart TV, and a sound system being controlled by the control device 110.

The plurality of UIs 402 may additionally include one or more data items 406 indicating a status of the device 105 being controlled by the particular UI 402. For example, the status of the device 105 may indicate whether the interface module 120 is operating in a "point and control" mode or a "fixed" mode, as will be described below. Each of the plurality of UIs 402 may further include one or more input elements 408a-c configured as defined functions performed in response to selection of respective ones of the input elements 408a-c. The input elements 408a-c may, for example, take the form of buttons, sliders, data entry fields, or the like. In the FIG. 5A example, the input elements 408a-c take the form of channel buttons, volume buttons, and arrows to name a few. An executable code for each of the UIs 402 may define functions performed in response to selection of respective ones of the input elements 408a-c. The executable code for respective UIs 402 may manage exchange of data with a corresponding one of the devices 105 being controlled.

Figure 5A:
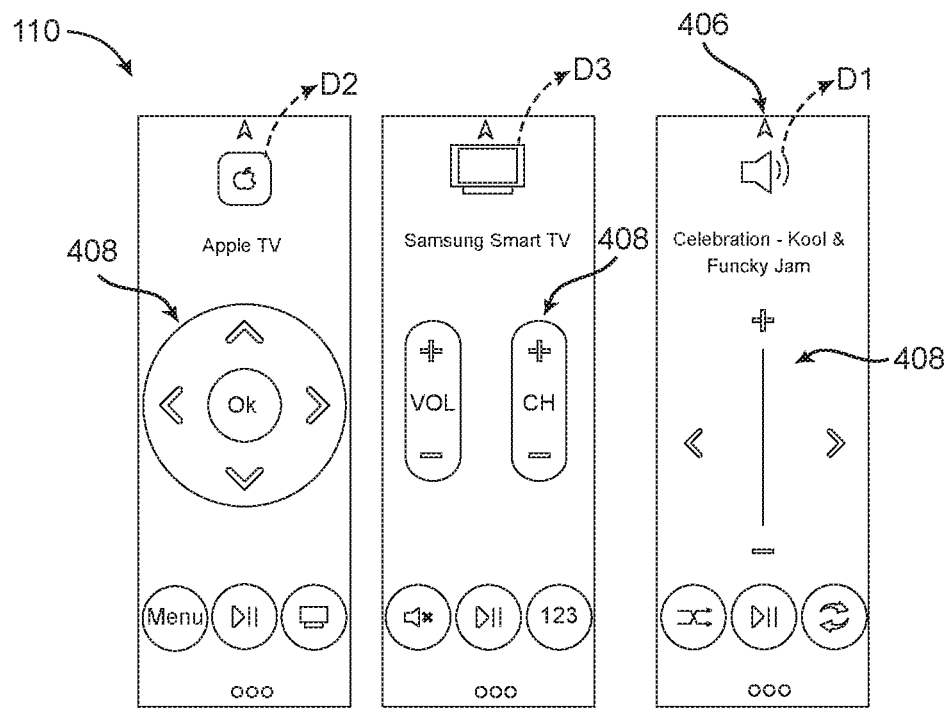
FIG. 5A is a series of example screenshots of the plurality of user interfaces stored within the primary interface layer and the secondary interface layer and displayed on the control devices when the carousel module operates in "point and control" mode, according to one illustrated and non-limiting embodiment.

FIG. 5A shows a series of example screenshots of the plurality of user interfaces 402 stored within the primary interface layer 145 and the secondary interface layer 150 and displayed on the control device 110 when the carousel module 140 operates in "point and control" mode, according to one illustrated and non-limiting embodiment.

Figure 5B:
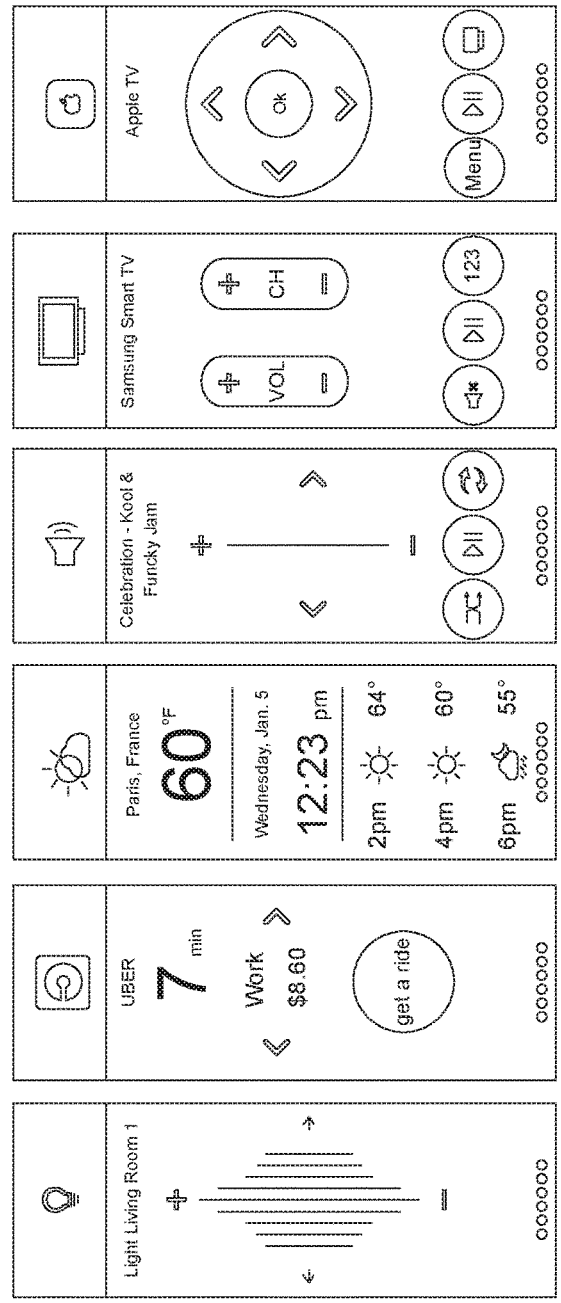
FIG. 5B is a series of example screenshots of the plurality of user interfaces displayed on the control device while the carousel module operates in "fixed" mode, according to one illustrated and non-limiting embodiment.

FIG. 5B shows a series of example screenshots of the plurality of user interfaces 402 alternately displayed on the control device 110 while the carousel module 140 operates in "fixed" mode, according to one illustrated and non-limiting embodiment.

During operation of the control device 110, the user may activate the system 100 to operate in "point and control" mode or "fixed" mode. "Point and control" mode may refer to the selection engine 135 operating in real-time to determine the devices 105 the control device 110 is targeting for control. As described above, the selection engine 135 is configured to define the spatial selection zone Z based on the location and orientation of the control device 110. The spatial selection zone Z includes the plurality of spatial coordinates having associated selection probabilities. The selection probabilities refer to a probabilistic likelihood that the respective device 105 (or associated region R) located at one or more particular spatial coordinates (e.g., X,Y or X,Y,Z) of the plurality of spatial coordinates was intended for control by the control device 110, In response to real-time determination of the spatial selection zone Z, the interface module 120 may determine whether any of the regions R, having been mapped to respective devices 105, are encompassed at least in part within the spatial selection zone Z.

The selection engine 135 may identify, in real-time, the three regions R associated with the devices 105c, 105a, and 105b as being at least partially included within the spatial selection zone Z. In response to such determination, the selection engine 135 may determine the probability values associated with each of the devices 105c, 105a, and 105b. As described above, these probability values associated with the particular spatial coordinates are identified by the selection engine 135 and used to stack rank the devices 105c, 105a, and 105b based on likelihood of intended selection by the user. The selection engine 135 may identify the first device D1 having highest likelihood of intended selection as being the device 105c, while the second device D2 having a second highest likelihood of intended selection as being the device 105b. Alternatively and/or additionally, the third device D3 having a third highest likelihood of intended selection may be determined as device 105a.

As illustrated in FIG. 5A, the UI controller 130 may actuate the carousel module 140 to display the first UI 402a (associated with the first device D1) stored within the primary interface layer 145 on the control device 110, responsive to identifying the first device D1 as having the first probability value (e.g., highest probability value of all selection probabilities). However, responsive to the user gesture on the control device 110, the UI controller 130 may actuate display on the control device 110 of the second and third UIs 402b, 402c (associated with the second device D2 and the third device D3, respectively) stored in the secondary interface layer 150.

in particular, the UIs 402a-c may be arranged in a loop configuration. Initially, the first UI 402a may be automatically displayed on the control device 110. Responsive to the user command (e.g., swiping gesture), the second UI 402b may override the first UI 402a and thus appear on the control device 110 display, Responsive to another user gesture or command on the control device 110, the third UI 402c may be displayed. Furthermore, a subsequent user gesture may cause the first UI 402a to reappear on the control device display. As such, the UIs 402a-c may be displayed sequentially as the user scrolls through the loop arrangement of the UIs 402a-c.

In the non-limiting embodiment illustrated in FIG. 5B, the carousel module 140 is configured to operate in the "fixed" mode. The "fixed" mode may refer to the UI controller 130 actuating display of respective ones of the UIs 402 in response to the user command without consideration of the spatial selection zone Z or the selection probabilities associated with spatial coordinates within the spatial selection zone Z. In other words, display of the UIs 402 may be actuated in response to manual selection by the user of the control device 110. For example, all the UIs 402 associated with the plurality of devices 105 may be distributed and stored in the primary interface layer 145 and/or the secondary interface layer 150. In particular, the UI controller 130 may actuate display of respective ones of the plurality of UIs 402 in response to the user gesture on the control device 110. For example, the user may implement a swiping motion on the control device 110 display to actuate scrolling between the UIs 402. The order of the UIs 402 in the loop arrangement may be random. In another non-limiting embodiment, the order of the UIs 402 stored in the loop arrangement may be based on a frequency of use of respective UIs 402. In one non-limiting embodiment, a most recently displayed UI 402 may be initially displayed on the control device 110.

The carousel module 140 may be actuated to operate in the "point and control" mode or the "fixed mode" in response to a swiping gesture or any other physical gesture on the control device 110 by the user. An indication of the mode of operation may be on the control device 110 via the one or more data items 406.

Figure 6:
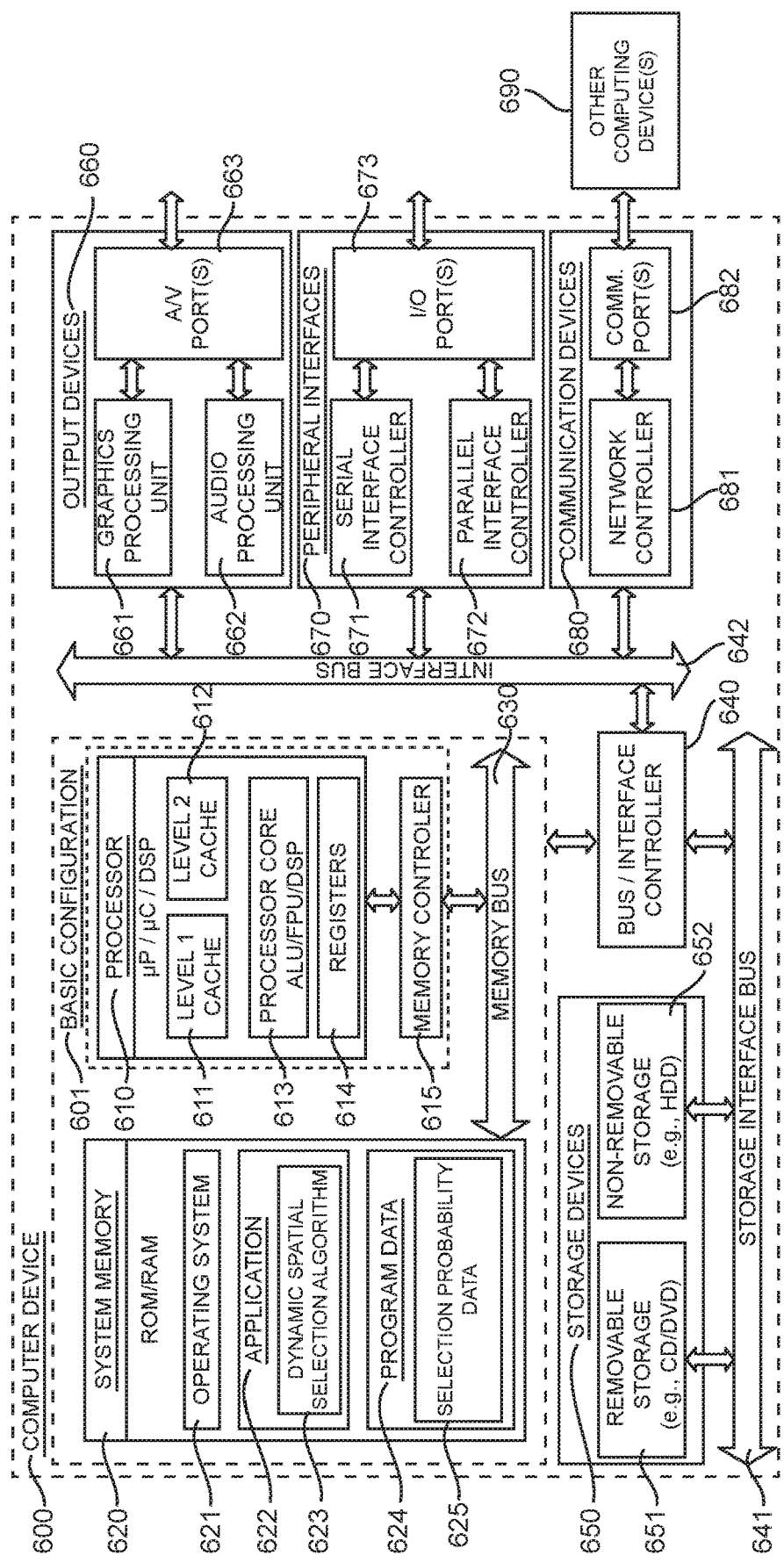
FIG. 6 is a block diagram illustrating an example interface module arranged for determining the spatial selection zone based on a location and orientation of the control device, according to one illustrated and non-limiting embodiment.

FIG. 6 is a block diagram illustrating an example interface module 120 in the form of a computer device 600 arranged for determining the spatial selection zone Z based on a location and orientation of the control device, and actuating display of the respective UIs 402 on the control device 110 in accordance with the present disclosure. In a very basic configuration 601, the computer device 600 typically includes one or more processors 610 and system memory 620. A memory bus 630 may be used for communicating between the processor 610 and the system memory 620.

Depending on the desired configuration, processor 610 may be of any type including but not limited to a microprocessor (μP), a microcontroller (μC), a digital signal processor (DSP), or any combination thereof. Processor 610 may include one or more levels of caching, such as a level one cache 611 and a level two cache 612, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a dynamic spatial selection algorithm (DSSA) 623 that is arranged to define the spatial selection zone Z associated with the location and orientation of the control device 110. Program data 624 includes selection probability data, position and orientation data of the control device 110, regions R associated with respective ones of the devices 105 and other data 625 that is useful to identify the one or more devices 105 intended to be controlled by the user and stack rank the UIs 402 associated with the one or more devices 105 based on selection probabilities, as described above.

In some non-limiting embodiments, application 622 may be arranged to operate with program data 624 on an operating system 621 such that the first UI 402a of the first device D1 having the greatest probability of intended selection by the user is displayed on the control device 110, with an option for the user to manually gesture or swipe the control device 110 to alternatively display other ones of the UIs 402b, 402c associated with devices 105 having less probability of intended selection. This described basic configuration is illustrated in FIG. 6 by those components within dashed line 601.

The computer device 600 may have additional features or functionality and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651, and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computer device 600. Any such computer storage media may be part of device 600.

Computer device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more 10 ports 673. An example communication device 680 includes a network controller 681, which may be arranged to facilitate communications with one or more other computing devices 690 (e.g., control device 110, device 105, beacon 115) over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media, A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

Computer device 600 may be implemented as a portion of a small-form factor portable (or mobile) electronic device such as a cell phone, a personal media player device, a wireless web-watch device, a personal headset device, an application specific device, or a hybrid device that includes any of the above functions. Computer device 600 may also be implemented as a personal computer including both laptop computer and non-laptop computer configurations. In another example, the computer device 600 may be a cloud-based server system communicative coupled to the control device 110 and the beacons 115 via the network 125.

Figure 7:
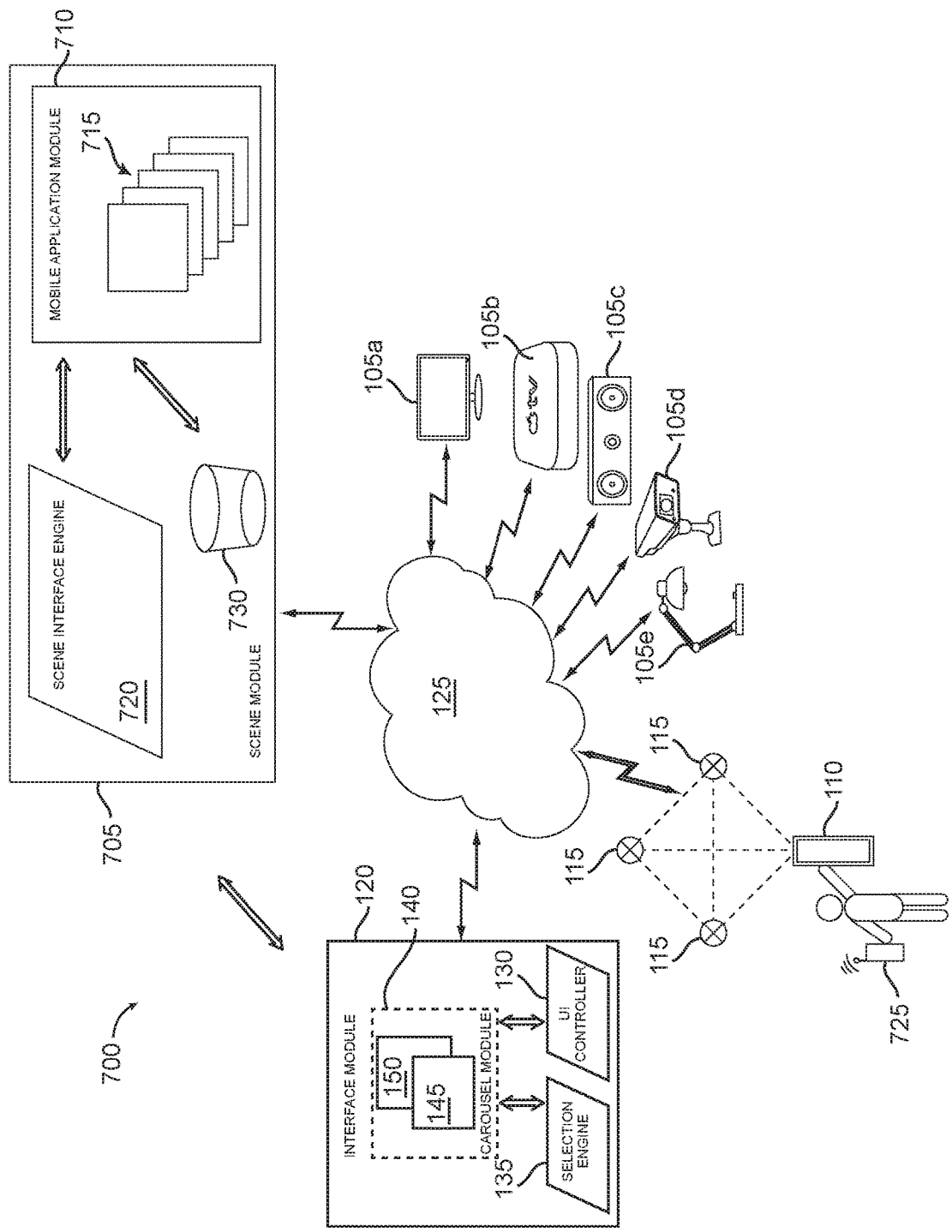
FIG. 7 is a schematic illustration of a system for creating a scene to seamlessly control a sub-group of devices from the plurality of devices via a control device, according to one illustrated and non-limiting embodiment.

FIG. 7 shows a schematic illustration of a system 700 for creating a user interface (UI) for a scene object used to control respective ones of the plurality of devices 105, according to one illustrated and non-limiting embodiment.

The system 700 includes components previously described above with reference to FIG. 1A and thus will not be described again for sake of brevity. For clarity, the previously described components maintain the same reference numbers as any of FIGS. 1A-6.

The system 700 may include a scene module 705 configured to create the UI for the scene. The scene module 705 may be communicatively coupled to the carousel module 120 and to the UI controller 130. The scene module 705 comprises a mobile application module 710 having one or more input widgets 715 and a scene interface engine 720. The one or more input widgets 715 are configured to form a communication link between the scene module 705 and respective ones of the devices 105. Additionally, as will be described below, the one or more input widgets 715 may be leveraged to create a communication path between the control device 110 and respective ones of the devices 105. The system may further include a mobile device 725 communicatively coupled to the scene module 705. In particular, the mobile application module 710 may operate on the mobile device 725 to cause the scene module 705 to associate at least one of the first and the second devices 105a, 105b with each of the one or more input widgets 715. For example, a downloadable mobile application may be stored on the mobile device 725 to allow for the user of the mobile device 725 to transmit commands to the mobile application module 710. The commands received from the mobile device 725 may be used to associate at least one of the first and the second devices 105a, 105b with each of the one or more input widgets 715 and create the scene object. The "scene object" may refer to the aggregate of the one or more input widgets 715 associated with respective ones of the first and second devices 105a, 105b. The "UI for the scene object" refers to a graphical user interface (e.g., transitional graphical user interface) automatically created to allow the user to efficiently control the first and second devices 105a, 105b via the respective widgets 715 on a single display screen. In non-limiting embodiments, a scene object may be represented by one or more selectable options (e.g., graphical icons, links, voice-activated phrases, and/or the like).

In non-limiting embodiments, the devices 105 may be categorized such that one or more devices are in each of a plurality of device categories. For example, the device categories may include a media source device category (e.g., for one or more source devices from which media content is output), a receiver device category (e.g., for one or more A/V receivers or other forms of devices for interconnecting one or more other devices), a display device category (e.g., for one or more displays, such as one or more monitors, projectors, mobile devices, headsets, and/or the like), and an audio device category (e.g., for one or more audio devices, such as one or more stereo systems, speakers, headphones, and/or the like). Other categories may be included. In non-limiting embodiments, the control device and/or a separate mobile device may determine the devices in communication with the control device (e.g., that are registered with the control device, detected by the control device, and/or the like) and the categories of each device. The categories may be stored in association with a device identifier. In some non-limiting embodiments, the control device and/or mobile device may determine the device category based on one or more characteristics of the device, such as a device profile, device identifier, past usage of the device, data provided from the device, and/or the like.

The one or more input widgets 715 may take the form of at least one of a source widget, a receiver widget, a display widget, a sound widget, and an existing scene widget. In other words, the input widgets 715 may serve as parameter inputs drawn from one or more of the devices 105 according to the following. In one non-limiting embodiment, the source widget may serve as a communication link to at least one device 105 (e.g., devices categorized in a media source device category) used as a source to extract media content (e.g., audio and/or visual content). Example devices 105 may include a Roku®, Apple® TV, Blueray player, Xbox, etc. Additionally, a source device 105 may be a TV tuner or an application running on a smart TV. The source widget may generate a communication path between the control device 110 and one of an Apple® TV device, Playstation®, Kodi4, and/or streaming digital media applications (e.g., Netflix®, HULU®, or the like) executing on a device.

The receiver widget may serve as a communication link to at least one device 105 (e.g., devices categorized in a receiver device category) which the audio and/or visual content from the source device 105 is transmitted through. For example, the Apple® TV device may be coupled to a Denon CDJ-4000 receiver. The display widget may serve as a communication link to one or more devices 105 that may be controlled to adjust display of the audio/visual (A/V) content. In one non-limiting embodiment, the display widget may be a smart TV (e.g., SAMSUNG® TV), tablet, laptop, mobile communication device, or even a projector operable to visually display media content.

The sound widget may serve as a communication link to one or more devices 105 (e.g., devices categorized in an audio device category) that may be controlled to adjust an audio volume. In one non-limiting embodiment, the audio volume of media content may be controlled on a set-top box, TV, receiver, or on a sound bar. For example, Roku®, Apple® TV, Sonos PlayBar, or any WiFi® device having an audio input may be selected as the linked one or more devices 105 to the sound widget. Although Roku® and Apple® TV may not have embedded volume control, such devices may instead pass through the volume control through HDMI-CEC to whatever device is coupled to the Apple® TV through an HDMI port.

The existing scene widget may serve as a communication link to another scene that has already been established by the scene module 705. For example, the existing scene may be a "home" scene that has established a defined input setting drawn from one or more non-A/V devices lighting, shades, thermostat) that are also coupled to the same network 125. An existing home scene may be associated with a selectable option that, when selected, activates the home scene. For example, the existing home scene may be a defined illumination intensity or hue associated with the device 105e or a defined temperature associated with a thermostat. In such non-limiting embodiment, as will be described below, upon activation of the A/V scene (e.g., via selection of a corresponding selectable option), the attached home scene may also be activated.

In some non-limiting embodiments, the scene module 705 may further include a scene database 730 to store one or more of the existing home scenes as well as the newly created scene objects. The mobile application module 710 may be coupled to the scene database 730 to attach (e.g., associate the objects) the selected home scene to the scene being created (e.g., A/V scene). As such, upon activation or selection of the scene by the user, the attached home scene may also be activated.

The scene interface engine 720 may be configured to add the devices 105 associated with the one or more widgets 715 to the scene object. The mobile application module 710 receives selection commands from the mobile device 725 to associate at least one of the first and the second devices 105a, 105b with each of the one or more input widgets 715. In another non-limiting embodiment, at least the first device is pre-selected based on a user's past selection habits. In one example, the scene interface module may employ machine learning algorithms to identify the user's behavior patterns. Based on such identified patterns, the scene interface engine 720 may pre-select and/or activate particular devices. The association of input widgets with respective devices 105 creates the scene object. The scene interface engine 720 operates to activate the selected first and second devices 105a, 105b. In one non-limiting embodiment, the scene interface engine 720 transmits a power ON power activation signal) control signal to the first and second devices 105a, 105*b* to confirm proper connection of the first and second devices 105*a*, 105*b* to the network 125. Then, the scene interface engine 720 may transmit an infrared code to each of the first and second devices 105*a*, 105*b* to associate at least one of the first and second devices with each of the input widgets 715, and thus create the scene object.

The scene interface engine 720 may be coupled to at least one of the mobile application module 710, the carousel module 140, and the UI controller 130. The carousel module 140 may store the UIs associated with the devices 105 of the input widgets 715 associated with the scene object in the first and second interface layers 145, 150. In one non-limiting embodiment, the first UI of the first device 105*a* associated with the display widget may be stored in the primary interface layer 145, while at least the second UI of the second device 105*b* associated with the source widget may be stored in the secondary interface layer 150. In other non-limiting embodiments, there may be additional UIs stored in the secondary interface layer 150. In response to a selection of the scene (e.g., "point and control" mode or "fixed" mode), the scene interface engine 720 may actuate the UI controller 130 to display the first UI from the primary interface layer on the control device 110 and subsequently actuate display of at least the second UI from the secondary interface layer responsive to a user command via the control device. The user command via the control device 110 may, for example be a swiping gesture to transition display on the control device 110 from the first UI to the second UI. As will be described below, the selection of the scene object may take the form of the user physically gesturing on the control device by, for example, clicking on an interface icon associated with the scene. In another non-limiting embodiment, the selection of the scene object may automatically occur responsive to the first device 105*a* being located at a spatial coordinate having the first probability value. In such scenario, the first UI from the primary interface layer 145 may be displayed, while the second UI from the secondary interface layer 150 is displayed responsive to detecting a gesture on the control device by the user.

In non-limiting embodiments, activation of a selectable option associated with the scene object may cause a plurality of control signals to be generated. For example, at least one control signal for each device in the scene may be generated for transmission by the control device 110, The control signals may be transmitted in one or more sequences, for example, to control each separate device associated with the scene.

In non-limiting embodiments, creating a configuration for a scene is performed on both the control device 110 and a separate mobile device. As is shown below in a non-limiting example in FIGS. 8A-8C and 9A-9E, a mobile device may be used to receive a first set of user inputs to create the scene object and a control device 110 may be used to receive a second set of user inputs to create the scene object.

Figure 8A:
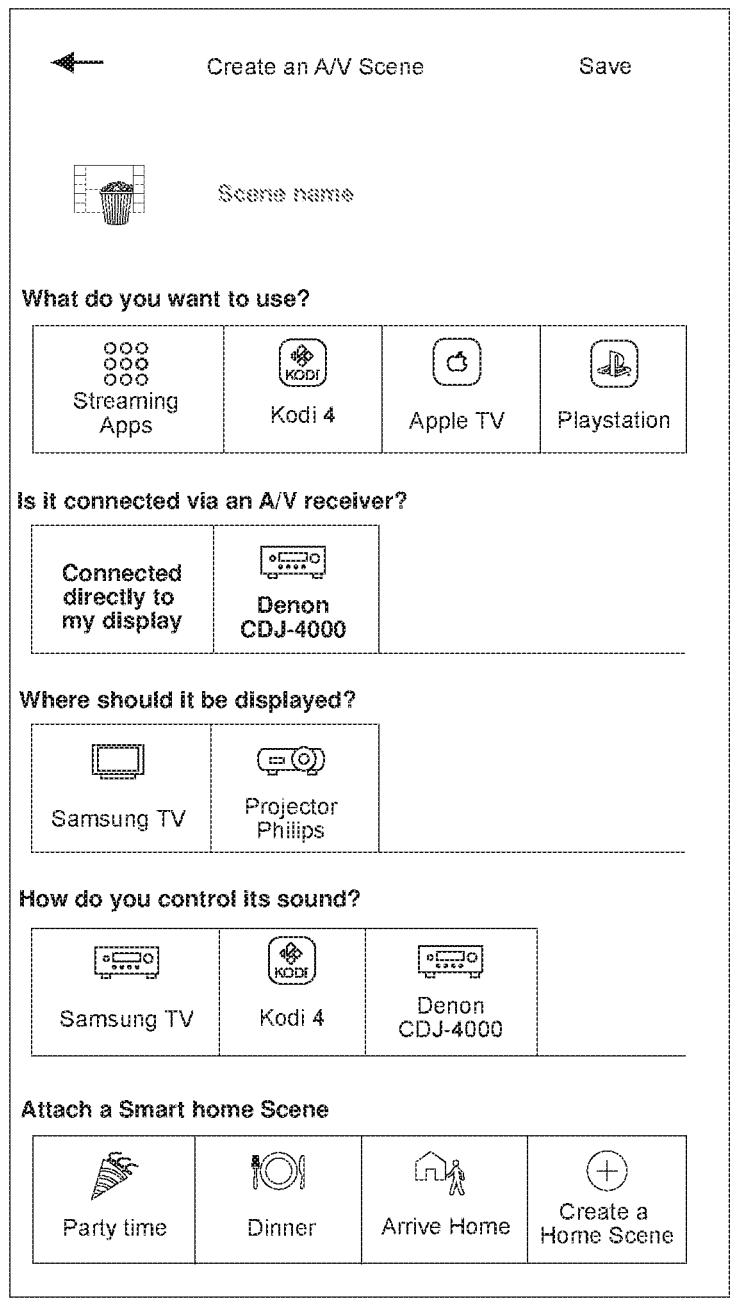
FIGS. 8A-8C are illustrations of screenshots of a mobile application module operating on a mobile device, according to one illustrated and non-limiting embodiment.
Figure 8C:
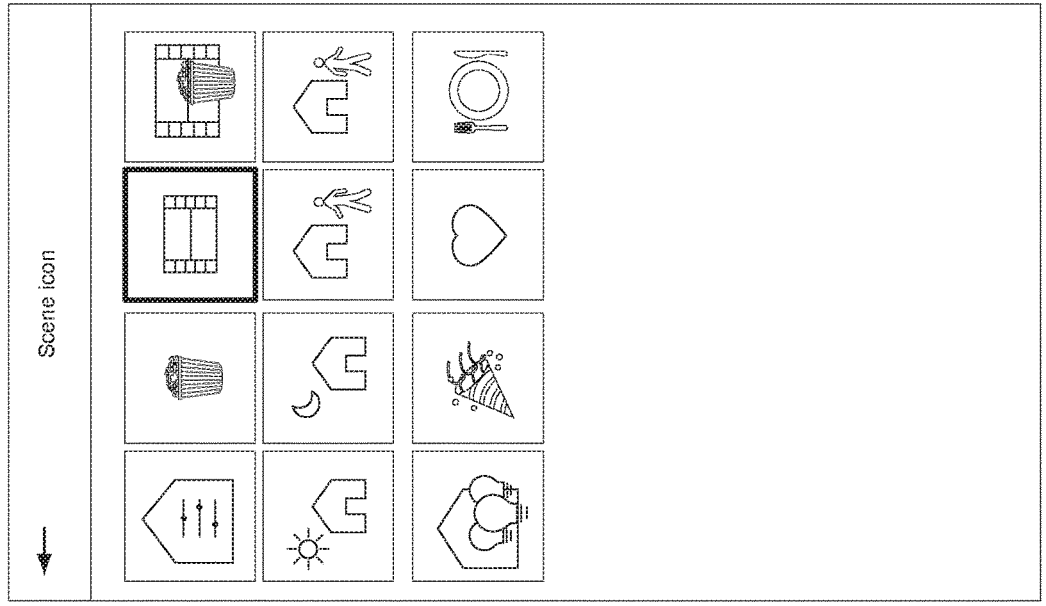
Figure 8B:
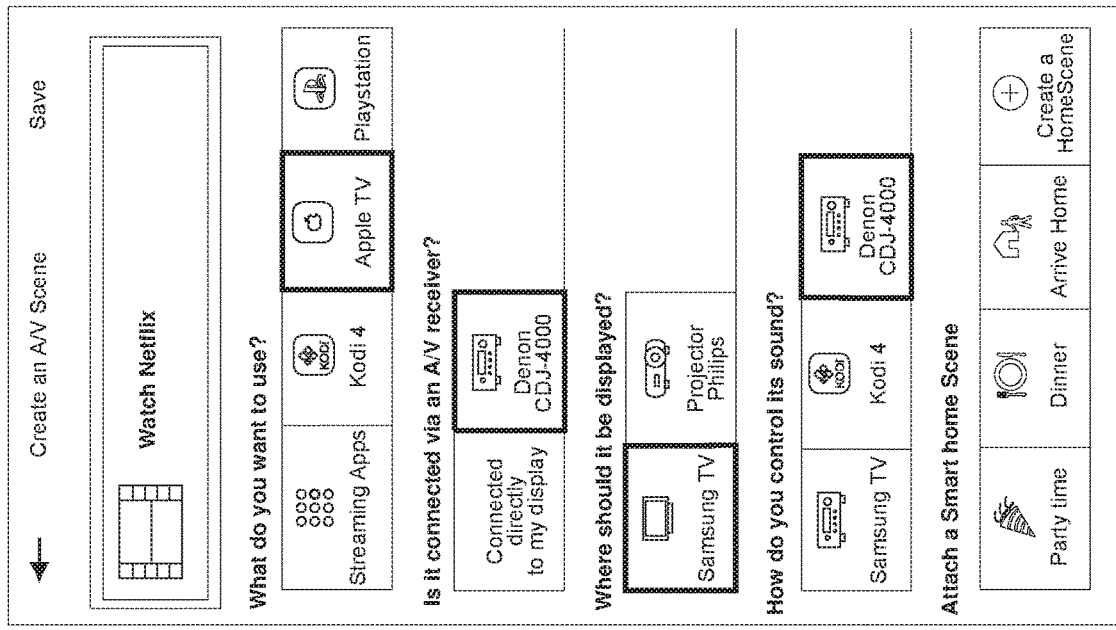

FIGS. 8A-8C show illustrations of screenshots of a mobile application module operating on the mobile device 725, according to one illustrated and non-limiting embodiment. FIGS. 9A-9E show illustrations of screenshots of the control device 110 operating to create the user interface for the scene object, according to one illustrated and non-limiting embodiment. FIG. 10 shows an illustration of screenshots on the control device 110 depicting the transitional user interface for the scene object, according to one illustrated and non-limiting embodiment. Reference will now be made to FIGS. 8A-10 to describe and illustrate a method of creating the UI for the scene object on the control device 110.

The user of the control device 110 may initiate setup of the scene object creation by accessing the mobile application module 710. As mentioned above, the mobile application module 710 may operate on the control device 110 by way of the mobile application. In one non-limiting embodiment, the user of the control device 110 may log into the mobile application with defined user credentials and/or control device 110 credentials to initiate the scene object creation process for the particular user on the particular control device 110.

Upon accessing the mobile application module 710, the mobile application may display the one or more input widgets 715 leveraged to create the communication path between the control device 110 and respective ones of the first and second devices 105*a*, 105*b*. As illustrated in FIG. 8A, the mobile application module 710 actuates display of a graphical user interface representation of the one or more input widgets 715. For example: "What do you want to use?" may represent the source widget, "Is it connected via an A/V receiver?" may represent the receiver widget, "Where should it be displayed?" may represent the display widget, "How do you control its sound?" may represent the sound widget, and "Attach a smart home scene" may represent a respective one of the existing scene widgets. As illustrated in FIG. 8B, the user may affirmatively select ones of the devices 105 to associate with each of the widgets 715. The user selections of respective ones of the devices 105 determines those devices to be associated with respective widgets 715. In particular, based on the specific device 105 selected by e user to be associated with the source widget, a subset of the devices 105 may be available to choose from for the receiver widget. In other words, the user's choice of device 105 in a first widget will determine the subset of devices 105 that are available for association with a subsequent widget. In other non-limiting embodiments, selection of a specific device 105 from one widget may not affect the devices available for selection in another widget such that each widget operates independently.

In the FIG. 8B example, the Apple® TV device 105*b* is selected as input to the source widget, the Denon CDJ-4000 is selected as input to both the receiver widget and the sound widget, and the Samsung® TV is selected as input to the display widget. Additionally, in the FIG. 8B example, there is no selection of the existing home widget. It will be appreciated by those of ordinary skill in the art that selection of the devices 105 for each of the input widgets 715 may take various forms (e.g., clicking an icon, swiping an icon, speaking an audio command, etc.).

Furthermore, the mobile application module 710 may be configured to associate an identifier (e.g., a label or a name) with the scene object being created via the mobile device 725. The identifier may correspond to a selectable option, such as one or more graphical icons, links, voice-activated phrases, and/or the like. For example, the user may input text "Watch Netflix" to indicate the scene object having the specific association of the devices 105 with the one or more widgets 715 is useful for controlling devices 105 for viewing Netflix® streaming media (e.g., movies). To activate this selectable option, the user may select the text and/or speak the phrase, as examples. Additionally and/or alternatively, the user may be prompted by the mobile application to select a graphical icon as a selectable option to be used for activating the scene object. For example, a graphical icon may be attached to the input text of the object scene (see, FIG. 8C) or a separate graphical icon displayed on the control device 110.

Figure 9A:
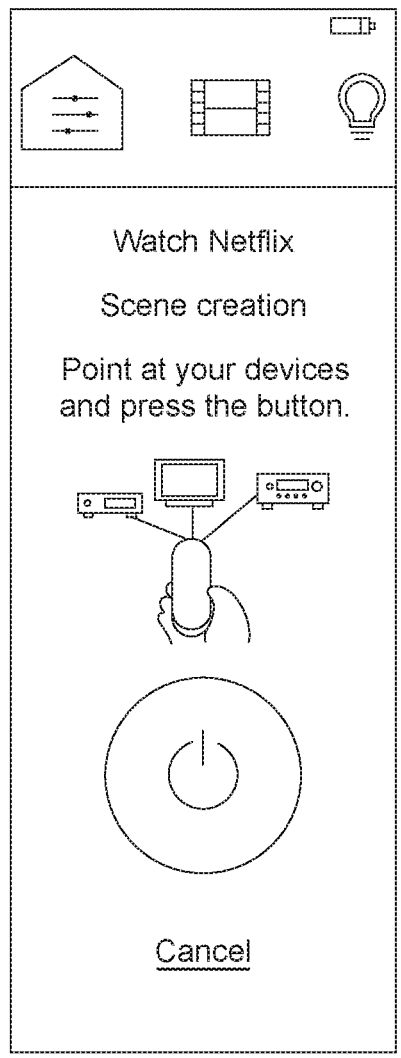
FIGS. 9A-9E are illustrations of screenshots of a scene interface engine operating on the control device to create a scene, according to one illustrated and non-limiting embodiment.
Figure 9B:
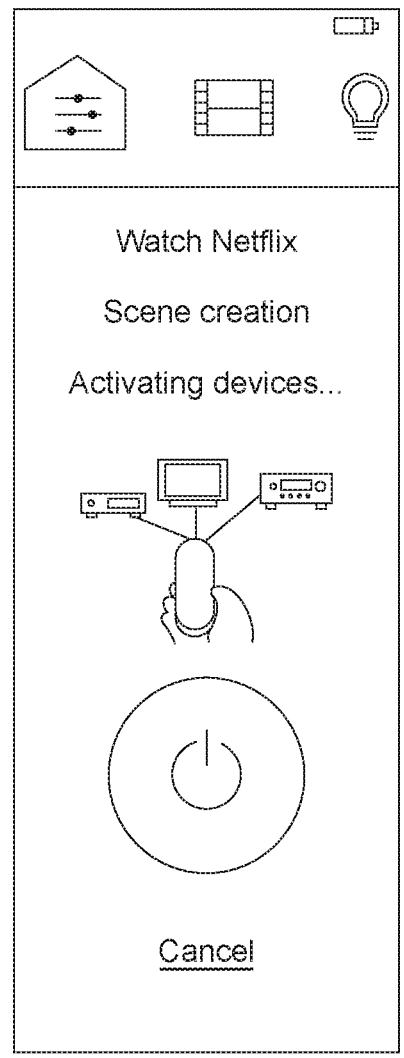
Figure 9E:
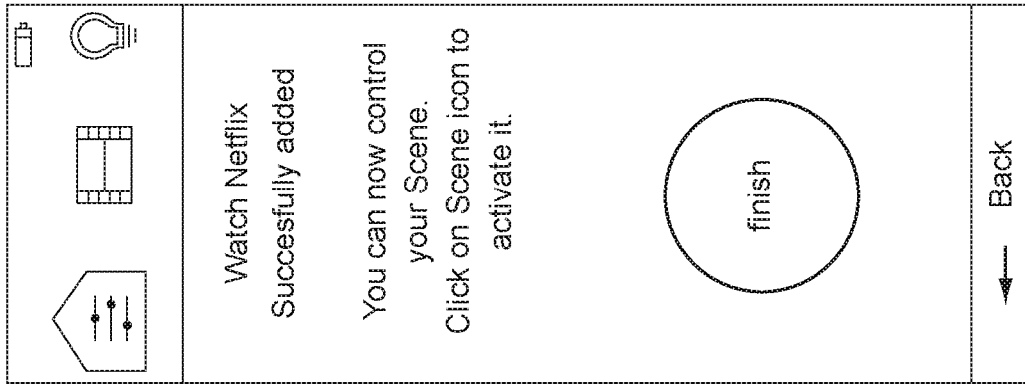
Figure 10:
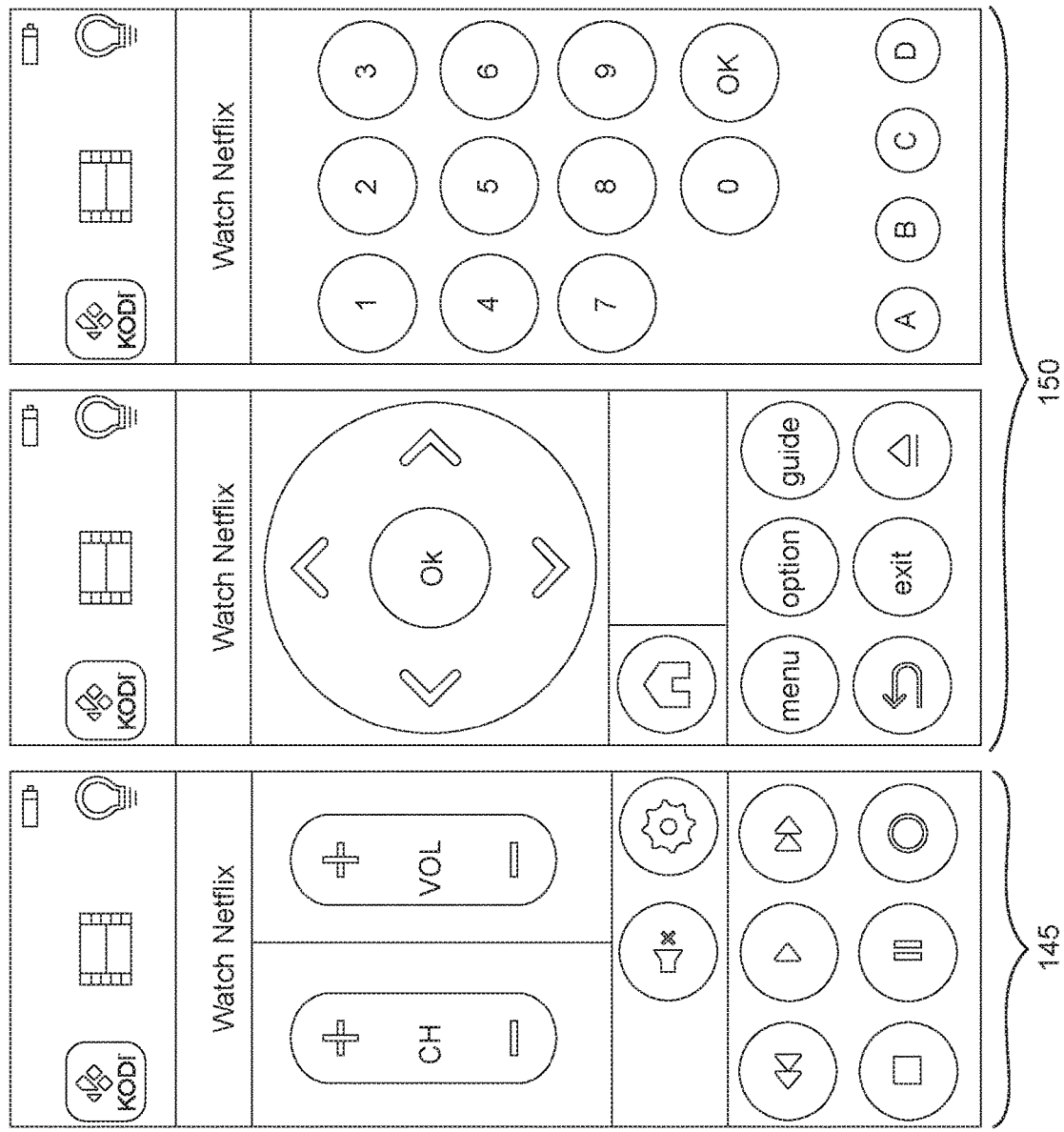
FIG. 10 is an illustration of screenshots on the control device depicting the transitional user interface for the scene, according to one illustrated and non-limiting embodiment.

Referring to FIGS. 9A-9B, upon completion of the scene object setup, the user may initiate validation of the scene object. The control device 110 may display an indication of the newly created scene object on the control device 110. In some non-limiting embodiments, the newly created scene object may automatically be displayed on the control device 110 upon completion of the scene object setup via the mobile device 725. For example, upon completion of one or more tasks on the mobile device, the control device 110 may be automatically activated by being unlocked, by displaying a UI, by displaying a notification, and/or the like.

Figure 9D:
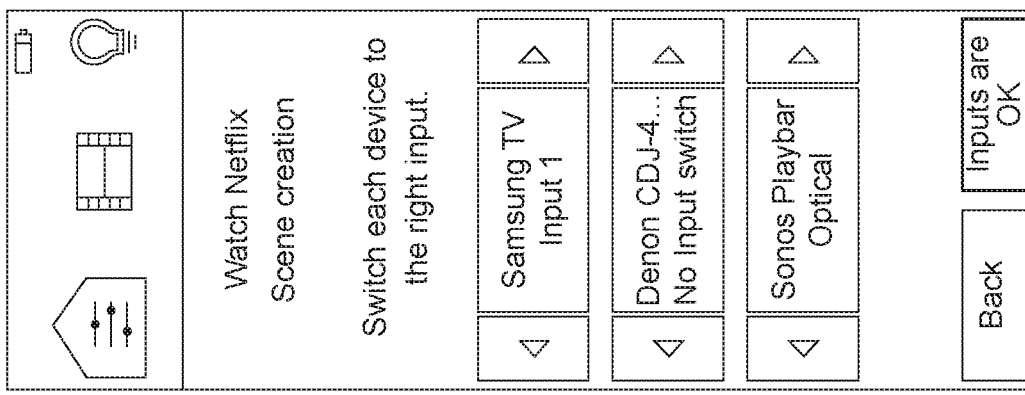
Figure 9C:
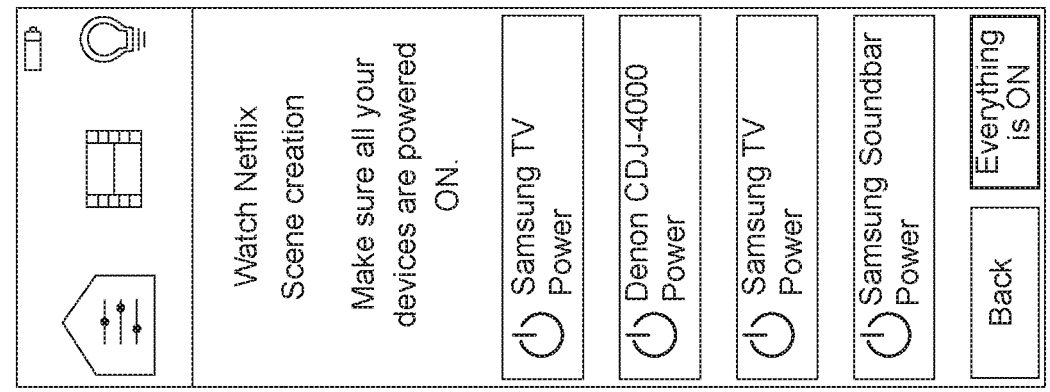

Referring to FIG. 9C, responsive to the user initiating validation of the scene object, the devices 105 associated with the scene object may be activated. In particular, the scene interface engine 720 may cause the control device 110 to transmit a power ON control signal to respective ones of the scene object devices 105. The power ON transmission may cause powering up and activation of the scene object devices 105. Powering of the scene object devices 105 may be advantageous to confirm connectivity. It will be appreciated that non-limiting embodiments described herein may encompass multiple types of devices 105. For example, a first device type may be the device 105 having a same ON/OFF switch, while a second device type may be the device 105 having separate ON and OFF switches. Having the same ON/OFF switch allows for a same communication signal to turn the first device type both ON and OFF. On the other hand, having separate ON and OFF switches may entail two distinct communication signals to turn the second device type ON or OFF. As such, responsive to the user initiating validation of the scene object, the first type devices 105 associated with the scene object may be automatically activated. In particular, the scene interface engine 720 may cause the control device 110 to transmit a power ON control signal to respective ones of the first type devices 105 associated with the scene object. The power ON transmission may cause powering up and activation of the first type devices 105 associated with the scene object.

Furthermore, responsive to initiating validation of the scene object, the second type devices 105 are displayed on the control device 110. For example, the second type devices 105 may be displayed on a single screen of the control device for easy viewing by the user. Responsive to having the second type devices 105 displayed on the control device 110, the user may readily decipher whether ones of the second type devices 105 are actually ON or OFF. For the ones of the second type devices 105 that the user determines are OFF, the user may select the respective second type devices 105 on the control device 110 display to turn that device 105 ON. Once all the second type devices 105 are determined to be ON and/or manually selected to ON via the control device 110, the user may select "Everything is ON" on the control device 110. Powering of the scene object devices 105 (both the first and second type devices) may be advantageous to confirm connectivity.

In the non-limiting embodiment illustrated in FIG. 9D, the scene interface engine 720 displays the connected devices. In the FIG. 9D example, powered Samsung® TV device is associated with both the source widget and the display widget, the powered Denon CDJ-4000 is associated with the receiver widget, and the powered. Songs Playbar is associated with the sound widget. The user may toggle between devices 105 associated with a respective one of the input widgets 715 to confirm each device 105 is associated with the proper input widget 715.

Responsive to having all the devices 105 associated with the scene object turned. ON, the control device 110 may display those devices 105 associated with the scene object having multiple inputs. As such, the user may select respective ones of the displayed devices 105 on the control device 110 to toggle between inputs. In other words, the user may cycle through inputs for each of the multiple input devices 105 where all of the multiple input devices are displayed on a single display screen of the control device 110. Having all the multiple input devices appear on the single display screen is advantageous to the user. For example, the user may toggle between inputs for a respective one of the multiple input devices 105 and physically decipher on the associated device 105 whether the currently selected input is proper.

Responsive to the scene object devices 105 being associated with the proper input widgets 715, the user may actuate the scene interface engine 720 to transmit an infrared (IR) code to each of the scene object devices 105. The IR code may be advantageous to pair the scene object devices 105 with the one or more input widgets 715 under the associated scene object name or metatag ("Watch Netflix"). Consequently, in response to the user clicking on "Inputs are OK," the scene interface engine 720 may record the input widget settings (i.e., the devices associated with each of the input widgets). The input widget settings may, for example, be saved in the scene database 730, which includes one or more defined home scene objects.

Referring to FIG. 10, the UI for the scene object may be created upon selection of the scene object. The scene object may be selected in response to a selection command from the user or automatically created responsive to the first device 105a of the scene object devices 105 being located at the first one of the plurality of spatial coordinates having the first probability value. The first probability value has the greatest likelihood, throughout the spatial selection zone Z, that the first device 105a is being targeted for control by the control device 110.

Upon selection of the scene object, the scene interface engine 720 may actuate the UI controller 130 to display the first UI from the primary interface layer 145 on the control device 110 and subsequently actuates display of at least the second UI from the secondary interface layer 150 responsive to the user command via the control device. As previously mentioned, the user command (e.g., swiping gesture) may serve to transition display of the first UI on the control device 100 to display the second UI. The selection of the scene may take the form of the user physically gesturing on the control device by, for example, clicking on an interface icon associated with the scene. In another non-limiting embodiment, the selection of the scene may automatically occur responsive to the first device 105a being located at a spatial coordinate having the first probability value. In such scenario, the first UI from the primary, interface layer 145 may be displayed, while the second UI from the secondary interface layer 150 is displayed responsive to detecting a gesture on the control device by the user.

In one non-limiting embodiment, the first UI is a graphical user interface (GUI) to control the first device 105a, while the second UI is a GUI to control the second device 105b. As describe above, each of the plurality of UIs 402 is operable to control operation of the plurality of devices 105 by having one or more input elements or settings pertaining to respective ones of the devices 105. For example, the input settings for a particular one of the UIs 402 may include volume toggle, channel toggle, numerical keypad, scroll wheel, light intensity, ride sharing request button, or the like. It will be appreciated by those of ordinary skill in the art that any type of input settings is contemplated by this disclosure and the examples provided herein are merely for purposes of illustrating functionality of the system 100 and its components.

In other non-limiting embodiments, the carousel module 140 is configured to combine the UI controls of several ones of the object scene devices. For example, the first UI may comprise a blended GUI to control both the first and the second devices 105a, 105b. In other words, the second UI may include a portion of the one or more input elements from another UI. Alternatively and/or additionally, the second UI may comprise a GUI to control both the second device 105b and an additional device 105c from the scene object devices 105. It will be advantageous to combine the UIs of various devices to increase efficiency of use of the control device 110. Additionally, the UI scene for the scene object may comprise the first and the second UIs formed in a closed loop arrangement. In other words, the second UI may be transitionally displayed on the control device 110 responsive to the user gesture. It will be appreciated by those of ordinary skill in the art that several other variations of the UI for the scene object are contemplated by this disclosure.

Figure 11:
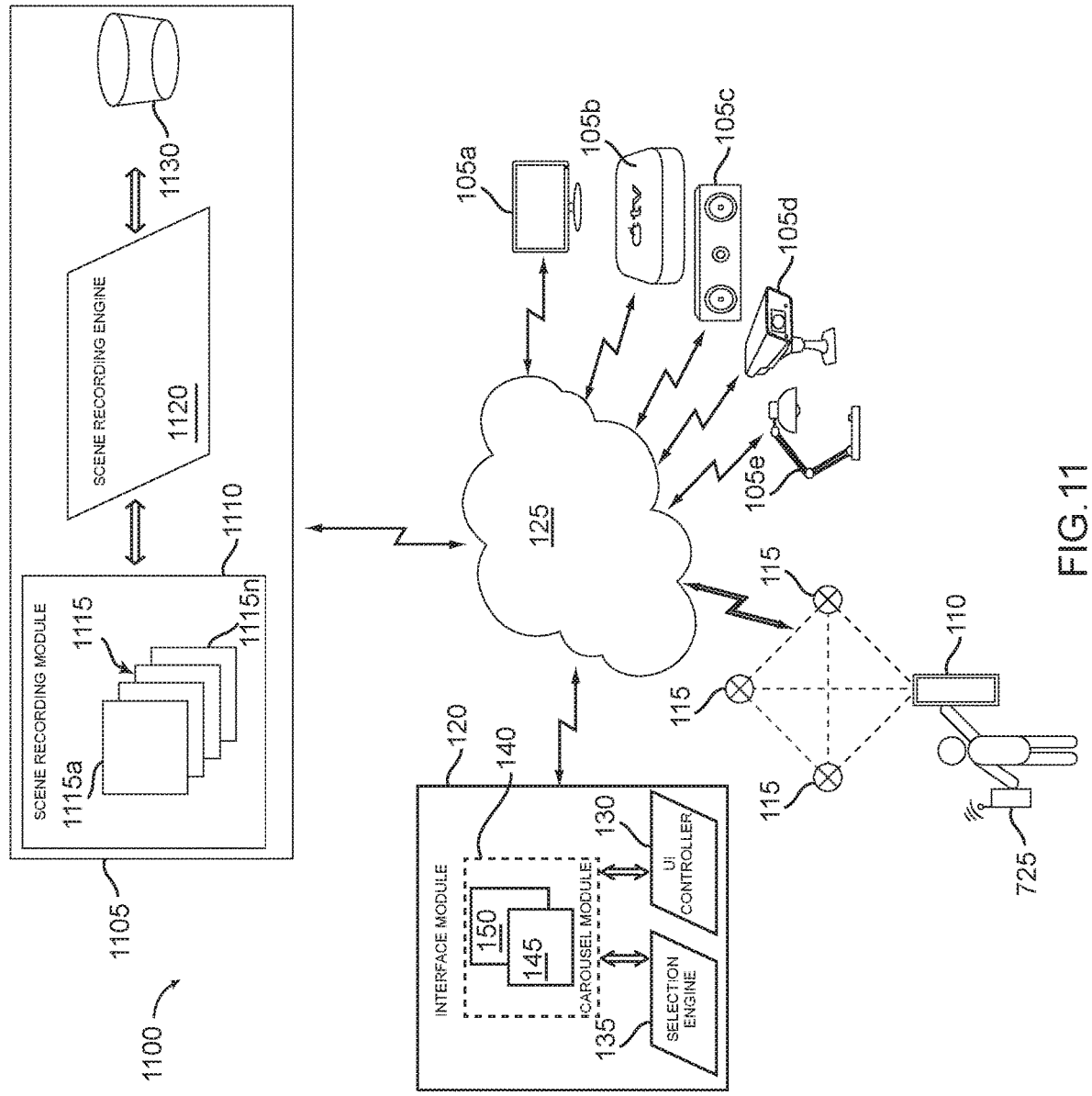
FIG. 11 is a schematic illustration of a system for real-time creation of a scene object during use of a control device to operate a plurality of devices, according to one illustrated and non-limiting embodiment, FIG. 12 displays illustrations of screenshots of a scene recording engine operating on the control device to program a scene object during real-time use of respective ones of the devices, according to one illustrated and non-limiting embodiment.

FIG. 11 shows a schematic illustration of a system 1100 for real-time creation of respective ones of a plurality of recorded scene objects 1115 during use of the control device 110 to operate the plurality of devices 105, according to one illustrated and non-limiting embodiment. The system 1100 includes components previously described above with reference to FIG. 1A and thus will not be described again for sake of brevity. For consistency, reference numbers of previously described components will be maintained unless specifically described otherwise hereinafter.

The system 1100 may include a real-time scene creation sub-system 1105 comprising a scene recording module 1110 and a scene recording engine 1120. The scene recording module 1110 may include the plurality of recorded scene objects 1115 configured to form a communication link to control first and second devices 105e, 105c of the plurality of devices 105. In one embodiment, the scene recording engine 1120 may take the form of a processor. According to one non-limiting embodiment illustrated in FIGS. 11-13, the first and second devices 105e, 105c may take the form of a lamp and an audio player (e.g., Sonos sound device), respectively. Additionally, as will be described below, the plurality of recorded scene objects 1115 may be leveraged to create the communication link between the control device 110 and respective ones of the devices 105. Optionally, the real-time scene creation sub-system 1105 may include a recorded scene object database 1130 configured to store the plurality of recorded scene objects 1115 accessible by the scene recording engine 1120 and/or the scene recording module 1110. Alternatively and/or additionally, the plurality of recorded scene objects 1115 may be stored in the scene recording module 1110. In one embodiment, the scene recording module 1110 is configured to identify ones of the plurality of devices 105 that are of a stateful type device and ones of the devices that are of a stateless type device. It will be appreciated by those of ordinary skill in the art that the stateful type devices include the devices 105 that operate via at least two types of communication signals (i.e., two-way communication). For example, the stateful type devices may have different ON and OFF switches having varying communication signals. On the other hand, the stateless type devices may include the devices 105 having a one-way communication capability (e.g., IR-controlled device). For example, the stateless type devices may have a same switch to control both the ON and OFF signals.

The mobile device 725 may be communicatively coupled to the scene recording module 1110. In particular, the scene recording module 1110 may operate on the mobile device 725 such that the user of the mobile device 725 may initiate creation of the recorded scene object 1115. For example, the user may actuate the mobile device 715 to input a label or name to be associated with the recorded scene object 1115 prior to the recorded scene object 1115 being programmed with operation settings of ones of the devices 105. In the non-limiting embodiment illustrated in FIG. 12, the "Good Morning" label, the "Lights ON" label, the "Movie lights" label, and the "Leave home" label are associated with respective ones of the plurality of recorded scene objects 1115. The labels associated with the recorded scene objects 1115 may be generated via the mobile device 725. As will be described below, the "Good Morning" label is associated with one of the plurality of recorded scene objects 1115a which has not yet been recorded. The "recorded scene object" provides defined operating commands or instructions based on recorded operating settings of first and second devices during use of the control device 110. The "recorded scene object" may be recorded and stored by the scene recording engine 1120 in the recorded scene object database 1130. Responsive to activation of the "recorded scene object," the operating settings of the first and second devices coupled to the network 125 may be automatically adjusted to substantially match the recorded input settings of the "recorded scene object."

The scene recording module 1110 is communicatively coupled to the control device 110. The mobile device 725 may transmit communication to the scene recording module 1110 via the network 125. The scene recording module 1110 may be configured to generate or create the plurality of scene objects 1115 operable to form the communication link to control the first and second devices 105e, 105c. The control device 1110 is operable to actuate programming of at least one of the plurality of scene objects 1115 and operate the first and second devices via respective ones of a first user interface (UI) and a second user interface (UI). In one non-limiting embodiment, the first UI 402e and the second. UI 402c may control the first and second devices 105e, 105c. The scene recording module 1110 may be configured to record real-time adjustment of operating settings of the first and second devices 105e, 105c. For example, the operating settings may be volume level, TV channel, light intensity, streaming media (e.g., HULU®, Netflix®, PREMIE® MUSIC), specific song choice or audio genre, or the like.

The scene recording engine 1120 may be communicatively coupled to the scene recording module 1110 and configured to associate the recorded operating settings of the first and second devices 105e, 105c with the respective one of the plurality of scene objects 1115. In particular, the recorded operating settings may be the last operating parameters of the first and second devices 105e, 105c prior to stopping recording. The scene recording engine 1120 may store the respective ones of the plurality of scene widgets 1115 together with the associated recorded operating settings of the first and second devices 105e, 105c in the recorded scene object database 130. Responsive to selection of a respective one of the plurality of scene objects 1115, the scene recording engine 1120 may actuate the first and second devices 105e, 105c to operate according to the associated recorded operating settings. In one embodiment, responsive to actuation of the first and second devices 105e, 105c, the control device 110 may display various details of the recorded operating settings (e.g., volume level, TV channel, light intensity, streaming media station (e.g., HULU®, Netflix®, PRIME® MUSIC), specific song choice or audio genre, or the like). The respective one of the plurality of scene objects 1115 may be selected by the user via the control device 110. In one non-limiting embodiment, the user may manually click on the scene object 1115 displayed on the control device 110. In another example, the user may implement other forms of gesture via the control device 110 (e.g., swipe gesture, physical manipulation of the control device, or voice activation). It will be noted that although the scene recording engine 1120 and the scene recording module 1110 are referenced herein as disparate components, it will be appreciated that the scene recording engine 1120 may be embedded within the scene recording module 1110.

Figure 12:
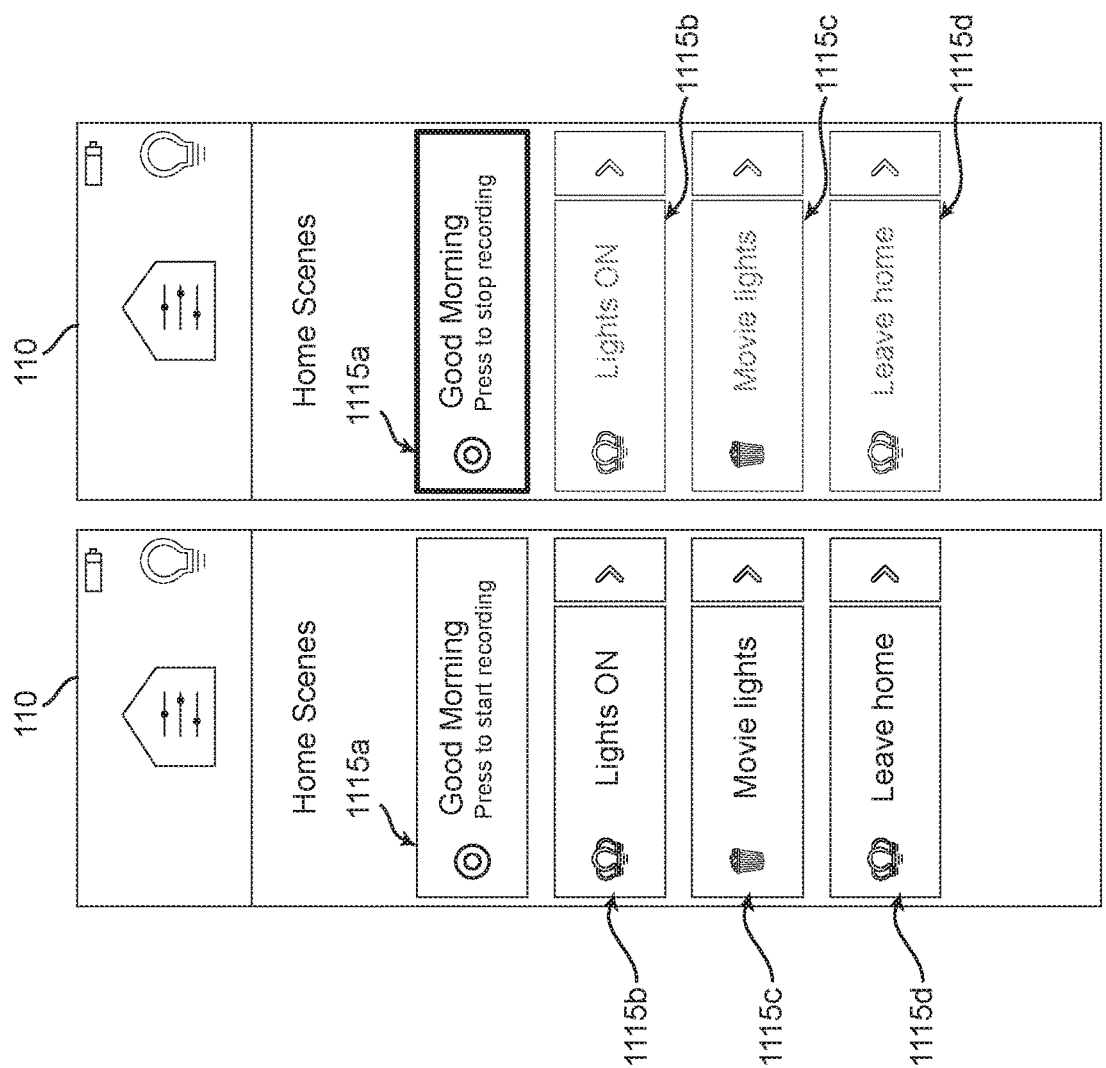

FIG. 12 displays illustrations of screenshots of the scene recording engine 1120 operating on the control device 110 to program the scene objects 1115a-1115d (collectively referenced herein as 1115) during real-time use of respective ones of the devices 105, according to one illustrated and non-limiting embodiment. FIG. 13 displays illustrations of a series of screenshots of the plurality of user interfaces 402 stored within the primary interface layer 145 and the secondary interface layer 150 and displayed on the control device 110 during programming of one of the plurality of scene objects 1115 during real-time use of respective ones of the devices 105, according to one illustrated and non-limiting embodiment.

Reference will now be made to FIGS. 12-13 to describe and illustrate a method for real-time programming of the plurality of scene objects 1115 during use of the control device 110 to operate a plurality of devices 105.

The mobile device 725 may have the scene recording module 1110 operating thereon in the form of a mobile application. For example, the mobile device 725 may be a smart phone having a mobile device application stored thereon and configured to create a communication interface between the mobile device 725 and the scene recording module 1110. As previously mentioned, the user of the mobile device 725 may initiate creation of the recorded scene object 1115. For example, the user may actuate the mobile device 725 to input a label or name to be associated with a first one of the recorded scene objects 1115. In the FIG. 12 example, the first recorded scene object 1115a will have an allocated name of "Good Morning." Although, at this point, the first recorded scene object 1115a has yet to be programmed, the scene recording module 1110 may create an empty or non-programmed first scene object 1115. "Non-programmed" or "empty" refers to there being no defined operating settings of the first and second devices 105e, 105c associated with the respective scene object 1115. In response to the newly created name for the first scene object 1115a, the scene recording module 1110 may actuate display of the first scene object 1115a name on the control device 110. For example, the interface module 120 may cause display of a listing of programmed scene objects 1115b-1115d and non-programmed scene object 1115a on the control device 110. The displayed listing of the programmed and non-programmed scene objects 1115b-1115d, 1115a may occur in response to the mobile device 725 creating the new name for the first scene object 1115a. In one non-limiting embodiment, the scene recording module 1110 may display only the newly created first scene object 1115a on the control device 110 indicating to the user the first screen object 1115 has yet to be programmed via recording control actions.

In response to selection of the non-programmed first scene object 1115a, the scene recording engine 1120 may initiate programming of the first scene object 1115a and activate the interface module 120. Programming of the first scene object 1115a may take the form of recording various operations or actions of the user on the control device 110 and then associating such operations with the first scene object 1115a. Recording of the first scene object 1115a may, for example, be initiated responsive to activation of a recording widget and the recording may be stopped responsive to deactivation of the recording widget. The recording widget may take the form of a graphical icon on a display of the control device 110.

As an example, programming of the first scene object 1115a may take the form of the user operating select ones of the first and second devices 105e, 105c via respective ones of the first UI 402e and the second UI 402c. The first UI 402e and the second UI 402c may control operation of the first and second devices 105e, 105c. The scene recording engine 1120 is configured to record the real-time adjustment of the operating settings of the first and second devices 105e, 105c. In one non-limiting embodiment, as the user adjusts the operating settings via the first and second UIs associated with the first and second devices 105e, 105c, respectively, the user experiences those changes in substantially real-time. For example, in response to the operating settings of the first and second devices 105e, 105c taking the form of a defined brightness, color, and/or volume, the first and second devices 105e, 105c are actuated to operate according to such settings in substantially real-time. As such, the user may advantageously experience the actual changes to the operating settings of the first and second devices associated with the first scene object 1115 prior to completing programming of the first scene object 1115. Additionally, the user may implement the operating settings adjustment by leveraging the same first and second UIs 402e, 402c displayed when the first and second devices 105e, 105c are being operated outside of programming the first scene object 1115a (i.e., same UIs 402 as when in "fixed" or "point and control" mode).

The scene recording module 1100 may be operable to record the real-time adjustment of operating settings responsive to communication between the control device 110 and the first device 1105e via at least one of WiFi®, Bluetooth®, Ultra Wide Band (UWB), and Infrared communication protocols, or the like. During programming of the first scene object 1115a, responsive to disruption of a mode of communication between the control device 110 and the first device 105e, the control device 110 may display an indication of a communication error. For example, while recording the real-time adjustment of operating settings of the first device 105e, the control device 110 may display a Wi-Fi® communication error and discontinue recording. In another example, the control device 110 may instead maintain recording of the operating settings of the first device 105e via a different communication protocol (e.g., Infrared).

In a further non-limiting embodiment, the second UI associated with the second device 105c may be displayed on the control device 110 responsive to the first UI being displayed. For example, the scene recording module 1100 may identify a threshold number of prior uses by the user of both the first and second devices 105e, 105c together. As such, the second device UI may automatically be displayed upon selection or display of the first device UI. In other words, the scene recording module 1100 may learn to identify the user's habits of operating various ones of the devices 105 in conjunction with one another (e.g., via machine learning algorithms). Consequently, display of a subsequent UI may be accelerated via such machine learning algorithms.

In particular, programming the first object scene 115a may include the interface module 120 operating to display respective ones of the UIs 402 associated with the plurality of devices 105 on the control device 110. In one non-limiting embodiment, the carousel module 140 operates in "point and control" mode while in another non-limiting embodiment the carousel module 140 may operate in the "fixed" mode.

As described with regard to FIGS. 5A-5B, in "point and control" mode the selection engine 135 operates in real-time to determine the devices 105 the control device 110 is targeting for control. As illustrated in FIG. 13, the UI controller 130 may actuate the carousel module 140 to display the first UI 402e (associated with the first device 105e) stored within the primary interface layer 145 on the control device 110, responsive to identifying the first device 105e as having the first probability value (i.e., highest probability value of all selection probabilities). However, responsive to the user gesture via the control device 110, the UI controller 130 may actuate display on the control device 110 of the second UI 402c (associated with the second device 105c) stored in the secondary interface layer 150.

Initially, the first UI 402e may be automatically displayed on the control device 110 based on the selection engine 135 determination of the first device 105e being targeted for control. Responsive to the user command (e.g., swiping gesture), the second UI 402c may override the first UI 402e and thus appear on the control device 110 display. Alternatively, as illustrated in FIG. 13, responsive to the control device 110 location and position being shifted by the user, the selection engine 135 may determine the second device 105c as being targeted for control. As such, the second U1 402c may be displayed on the control device 110.

Alternatively, in the "fixed" mode, the UI controller 130 actuates display of respective ones of the UIs 402 in response to the user command without consideration of the spatial selection zone Z or the selection probabilities associated with spatial coordinates within the spatial selection zone Z. In other words, display of the UIs 402 may be actuated in response to manual selection by the user via the control device 110 regardless of position of the control device 110. For example, all the UIs 402 associated with the plurality of devices 105 may be distributed and stored in the primary interface layer 145 and/or the secondary interface layer 150. In particular, the UI controller 130 may actuate display of respective ones of the plurality of UIs 402 in response to the user gesture on the control device 110. For example, the user may implement a swiping motion on the control device 110 display to actuate scrolling between the UIs 402. Then, the first and second UIs 402e, 402c may be selected to adjust the operation settings of the first and second devices 105e, 105c. The scene recording engine 1120 may then record the operation settings and associate with the first object scene 1115a.

As mentioned above, the operating settings associated with each of the first and second devices 105e, 105c are recorded by the scene recording engine 1120 and ultimately programmed in the first scene object 1115a. The recorded first scene object 1115a may be stored in the recorded scene object database 1130.

The first scene object 1115a may be manually activated via the "fixed" mode operation or automatically activated via the "point and control" mode operation. As an example of the "fixed mode" activation of the first scene object 1115a, the control device 110 may receive a physical gesture from the user to select the first scene object 1115a. In one non-limiting embodiment, the first scene object 1115a may have a name and/or a graphical icon associated therewith that is displayed on the control device 110. For example, the interface module 120 may include a scene object UI (e.g., graphical UI of FIG. 12) to control respective ones of the plurality of recorded scene objects 1115. In response to a gesture (e.g., swipe, click, or other physical manipulation of the control device 110 or the UI) on the control device 110, the scene recording engine 1120 may access the recorded first scene object 1115a and automatically adjust the control settings of the associated first and second devices 105e, 105c according to the recorded operation settings. It is further contemplated by this disclosure that the first recorded scene object 1115a may have the recorded operation settings further altered by the user. In other words, the user may elect to override the recorded operation settings with, for example, different settings of the first and second devices, additional operation settings of additional ones of the plurality of devices 105, and/or remove at least one of the first and second devices.

Alternatively and/or additionally, the first scene object 1115a may be automatically activated via the "point and control" mode operation. The interface module 120 may leverage the positioning and orientation measurement methodologies described above to create the regions R for respective ones of the plurality of recorded scene objects 1115. As explained above, the regions R may be created at any desired location of the user, irrespective of the actual physical location of the devices 105 being mapped into the interface module 120. Similarly, the region R may additionally be created for the first recorded scene object 1115a. In one non-limiting embodiment, the region R for the recorded scene object 1115a may be proximate at least one of the first and second devices 105e, 105c or encompass an area unrelated to the first and second devices 105e, 105c. For example, for a "Leave home" scene object 1115d, the region R may include an area of a doorway, which may be distant from the actual ones of the devices 105 included within the "Leave home" scene object 1115d. As such, responsive to the region R of the first recorded scene object 1115a being at least partially encompassed within the spatial selection zone Z of the control device 110 at a particular position and orientation, the first recorded scene object 1115a may be activated. Responsive to the first recorded scene object 1115a being activated, the scene recording engine 1120 may access the recorded first scene object 1115a and automatically adjust the control settings of the associated first and second devices 105e, 1105c according to the recorded operation settings.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the above descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 4, or 5 items, and so forth.

What is claimed is:

1. A computer-implemented method for creating a configuration for a plurality of devices, comprising:
   in response to user input, monitoring user interaction with a control device to control each of the plurality of devices, the plurality of devices comprising at least one first device and at least one second device;
   recording, while monitoring the user interaction with the control device, at least one configuration setting based on at least one user input provided to the control device;
   in response to further user input, storing, with the control device, the at least one configuration setting in at least one memory of the control device;
   associating, at the control device, a plurality of configuration settings with a scene object, the plurality of configuration settings based on a plurality of user inputs provided to the control device and comprising the at least one configuration setting;
   creating, on a mobile device separate from the control device, an identifier for the plurality of configuration settings;
   in response to creating the identifier on the mobile device, automatically activating a user interface on the control device, wherein the user interface is configured to permit the control device to control one or more devices of the plurality of devices; and
   in response to activation of the scene object via the control device, transmitting a plurality of control signals, the plurality of control signals based on the plurality of configuration settings and configured to control the plurality of devices.

2. The computer-implemented method of claim 1, further comprising determining a plurality of devices in communication with the control device.

3. The computer-implemented method of claim 2, further comprising displaying a plurality of user interfaces configured to control the plurality of devices.

4. The computer-implemented method of claim 1, wherein the user input comprises activation of a recording option on a user interface of the control device.

5. The computer-implemented method of claim 4, wherein the further user input comprises activation of the recording option or a second recording option on the user interface of the control device.

6. The computer-implemented method of claim 1, wherein the plurality of configuration settings are recorded as a sequence based on an order of the plurality of user inputs, and wherein the plurality of control signals are transmitted based on the sequence.

7. The computer-implemented method of claim 1, wherein the at least one first device comprises a stateful device configured for bidirectional communication with the control device.

8. The computer-implemented method of claim 1, further comprising:

after associating the plurality of configuration settings with the scene object, adjusting at least one configuration setting based on further user input on the control device.

9. The computer-implemented method of claim 1, further comprising:
displaying, on the control device while recording the plurality of user inputs, a communication error notification based on detecting a network disruption; and
stopping recording the plurality of user inputs based on detecting the network disruption.

10. The computer-implemented method of claim 1, wherein the plurality of user inputs are input via a first user interface and a second user interface, wherein the first user interface is configured to control the at least one first device, and wherein the second user interface is configured to control the at least one second device.

11. The computer-implemented method of claim 10, further comprising:
determining that the at least one first device and the at least one second device have been used together based on a usage pattern; and
in response to determining that the at least one first device and the at least one second device have been used together based on the usage pattern, automatically displaying, on the control device, the second user interface, wherein the second user interface is configured to control both the at least one first device and the at least one second device.

12. The computer-implemented method of claim 1, wherein the control device comprises a remote control device comprising a touch screen, the remote control device configured to transmit control signals via at least one of infrared and radio frequencies.

13. The computer-implemented method of claim 1, wherein the at least one first device comprises a lighting device, and wherein the at least one configuration setting for the lighting device comprises a setting of at least one of an intensity and color.

14. The computer-implemented method of claim 1, wherein the scene object is displayed in a scrollable list among a plurality of scene objects, wherein each scene object is displayed with a name and a graphical icon.

15. The computer-implemented method of claim 1, wherein the plurality of configuration settings are recorded based on a state or setting of a device of the plurality of devices detected independently from the plurality of user inputs.

16. The computer-implemented method of claim 1, further comprising displaying a visual indicator when recording the plurality of configuration settings.

17. The computer-implemented method of claim 1, further comprising:
identifying user behavior patterns using the control device to control the plurality of devices; and
pre-selecting the at least one first device for monitoring user interaction based on the user behavior patterns.

18. A system for creating a configuration for a plurality of devices, comprising at least one processor configured to:
in response to user input, monitor user interaction with a control device to control each of the plurality of devices, the plurality of devices comprising at least one first device and at least one second device;
record, while monitoring the user interaction with the control device, at least one configuration setting based on at least one user input provided to the control device;
in response to further user input, store the at least one configuration setting in at least one memory of the control device;
associate, at the control device, a plurality of configuration settings with a scene object, the plurality of configuration settings based on a plurality of user inputs provided to the control device and comprising the at least one configuration setting;
automatically activate a user interface on the control device in response to creation on a mobile device of an identifier for the plurality of configuration settings, the mobile device being separate from the control device, wherein the user interface is configured to permit the control device to control one or more devices of the plurality of devices; and
in response to activation of the scene object via the control device, transmit a plurality of control signals, the plurality of control signals based on the plurality of configuration settings and configured to control the plurality of devices.

19. The system of claim 18, wherein the at least one processor is further configured to determine a plurality of devices in communication with the control device.

20. The system of claim 19, wherein the at least one processor is further configured to display a plurality of user interfaces configured to control the plurality of devices.

21. The system of claim 18, wherein the user input comprises activation of a recording option on a user interface of the control device.

22. The system of claim 21, wherein the further user input comprises activation of the recording option or a second recording option on the user interface of the control device.

23. The system of claim 18, wherein the plurality of configuration settings are recorded as a sequence based on an order of the plurality of user inputs, and wherein the plurality of control signals are transmitted based on the sequence.

24. The system of claim 18, wherein the at least one first device comprises a stateful device configured for bidirectional communication with the control device.

25. The system of claim 18, wherein the at least one processor is further configured to: after associating the plurality of configuration settings with the scene object, adjust at least one configuration setting based on further user input on the control device.

26. The system of claim 18, wherein the at least one processor is further configured to:
display, on the control device while recording the plurality of user inputs, a communication error notification based on detecting a network disruption; and
stop recording the plurality of user inputs based on detecting the network disruption.

27. The system of claim 18, wherein the plurality of user inputs are input via a first user interface and a second user interface, wherein the first user interface is configured to control the at least one first device, and wherein the second user interface is configured to control the at least one second device.

28. The system of claim 27, wherein the at least one processor is further configured to:
determine that the at least one first device and the at least one second device have been used together based on a usage pattern; and
in response to determining that the at least one first device and the at least one second device have been used together based on the usage pattern, automatically display, on the control device, the second user interface, wherein the second user interface is configured to control both the at least one first device and the at least one second device.

29. The system of claim 18, wherein the control device comprises a remote control device comprising a touch screen, the remote control device configured to transmit control signals via at least one of infrared and radio frequencies.

30. The system of claim 18, wherein the at least one first device comprises a lighting device, and wherein the at least one configuration setting for the lighting device comprising a setting of at least one of an intensity and color.

31. The system of claim 18, wherein the scene object is displayed in a scrollable list among a plurality of scene objects, wherein each scene object is displayed with a name and a graphical icon.

32. The system of claim 18, wherein the plurality of configuration settings are recorded based on a state or setting of a device of the plurality of devices detected independently from the plurality of user inputs.

33. The system of claim 18, wherein the at least one processor is further configured to display a visual indicator when recording the plurality of configuration settings.

34. The system of claim 18, wherein the at least one processor is further configured to:
   identify user behavior patterns using the control device to control the plurality of devices; and
   pre-select the at least one first device for monitoring user interaction based on the user behavior patterns.

35. A computer-program product for creating a configuration for a plurality of devices, comprising at least one non-transitory computer-readable medium including program instructions that, when executed by at least one processor, cause the at least one processor to:
   in response to user input, monitor user interaction with a control device to control each of the plurality of devices, the plurality of devices comprising at least one first device and at least one second device;
   record, while monitoring the user interaction with the control device, at least one configuration setting based on at least one user input provided to the control device;
   in response to further user input, store the at least one configuration setting in at least one memory of the control device;
   associate, at the control device, a plurality of configuration settings with a scene object, the plurality of configuration settings based on a plurality of user inputs provided to the control device and comprising the at least one configuration setting;
   automatically activate a user interface on the control device in response to creation on a mobile device of an identifier for the plurality of configuration settings, the mobile device being separate from the control device, wherein the user interface is configured to permit the control device to control one or more devices of the plurality of devices; and
   in response to activation of the scene object via the control device, transmit a plurality of control signals, the plurality of control signals based on the plurality of configuration settings and configured to control the plurality of devices.

* * * * *

UNITED STATES PATENT AND TRADEMARK OFFICE
CERTIFICATE OF CORRECTION

| | |
|---|---|
| PATENT NO. | : 11,663,904 B2 |
| APPLICATION NO. | : 17/274422 |
| DATED | : May 30, 2023 |
| INVENTOR(S) | : Simon Tchedikian and Mickael Touillaud |

It is certified that error appears in the above-identified patent and that said Letters Patent is hereby corrected as shown below:

In the Specification

In Column 1, Line 32, replace "ALEXAM" WITH --ALEXA®--.

In Column 10, Line 44, replace ""UT"" with --"UI"--.

In Column 12, Line 64, replace "(JWD" with --UWB--.

In Column 13, Line 2, replace "Zig-bee®" with --Zigbee®--.
In Column 13, Line 55, replace "Us 402" with --UIs 402--.

In Column 17, Line 27, replace "110," with --110.--.

In Column 18, Line 36, replace "(e.g., circle, square, etc.)" with --(e.g., elliptical, circle, square, etc.)--.

In Column 19, Line 33, replace "FIG. 2," with --FIG. 2.--.
In Column 19, Line 36, replace "regions 1Z" with --regions Z--.

In Column 24, Line 29, replace "media, A" with --media. A--.
In Column 24, Line 35, replace "(RE)" with --(RF)--.

In Column 26, Line 30, replace "devices lighting" with --devices (e.g., lighting--.
In Column 26, Line 66, replace "ON power" with --ON (e.g., power--.

In Column 28, Line 31, replace "e user" with --the user--.

In Column 29, Line 61, replace "powered. Songs Playbar" with --powered Sonos Playbar--.

In Column 32, Line 46, replace "PREMIE®" with --PRIME®--.

Signed and Sealed this
Fourth Day of July, 2023

*Katherine Kelly Vidal*
Katherine Kelly Vidal
*Director of the United States Patent and Trademark Office*

In Column 34, Line 41, replace "1105e" with --105e--.

In Column 35, Line 31, replace "second U1" with --second UI--.

In Column 36, Line 46, replace "1105c" with --105c--.

In Column 38, Line 8, replace "1, 2, 4," with --1, 2, 3, 4,--.